United States Patent
Yamaguchi et al.

(10) Patent No.: US 10,644,917 B2
(45) Date of Patent: May 5, 2020

(54) TRANSMISSION APPARATUS AND TRANSMISSION METHOD

(71) Applicant: Mitsubishi Electric Corporation, Tokyo (JP)

(72) Inventors: Kanako Yamaguchi, Tokyo (JP); Kaoru Tsukamoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/313,803

(22) PCT Filed: Aug. 25, 2016

(86) PCT No.: PCT/JP2016/074887
§ 371 (c)(1),
(2) Date: Dec. 27, 2018

(87) PCT Pub. No.: WO2018/037546
PCT Pub. Date: Mar. 1, 2018

(65) Prior Publication Data
US 2019/0238381 A1 Aug. 1, 2019

(51) Int. Cl.
*H04L 27/26* (2006.01)
*H04J 11/00* (2006.01)
*H04L 5/00* (2006.01)

(52) U.S. Cl.
CPC .......... *H04L 27/2628* (2013.01); *H04J 11/00* (2013.01); *H04L 5/001* (2013.01);
(Continued)

(58) Field of Classification Search
CPC ... H04L 5/0007; H04L 1/0003; H04L 1/0606; H04L 5/0044; H04L 27/2628
See application file for complete search history.

(56) References Cited

U.S. PATENT DOCUMENTS 10,404,346 B2 * 9/2019 Toda ............... H04W 24/00
2004/0190598 A1 9/2004 Seki et al.
(Continued)

FOREIGN PATENT DOCUMENTS

| JP | H11-298439 A | 10/1999 |
| WO | WO 03/021829 A1 | 3/2003 |
| WO | WO 2009/153998 A1 | 12/2009 |

OTHER PUBLICATIONS

Itami, "As easy-to-understand introduction to OFDM technology", Ohmsha Ltd., Nov. 2005, 13 pages.
(Continued)

*Primary Examiner* — David S Huang
(74) *Attorney, Agent, or Firm* — Birch, Stewart, Kolasch & Birch, LLP

(57) ABSTRACT

An OFDM transmission apparatus performs transmission using an orthogonal frequency division multiplexing scheme in one or a plurality of frequency bands and includes a symbol multiplexing unit to multiply a column vector containing a first number of modulated symbols generated by primary modulation in a frequency domain, by a precoding matrix having as many rows and columns as the first number to generate a multiplexed symbol group containing the first number of multiplexed symbols each containing a second number of the modulated symbols that are multiplexed, where the first number is two or more, and the second number is equal to or more than two and equal to or less than the first number; and a subcarrier allocation unit to allocate the multiplexed symbols contained in the multiplexed symbol group to different subcarriers.

19 Claims, 29 Drawing Sheets

(52) U.S. Cl.
CPC ............ *H04L 5/006* (2013.01); *H04L 5/0007* (2013.01); *H04L 27/2626* (2013.01)

(56) References Cited

U.S. PATENT DOCUMENTS

| | | | |
|---|---|---|---|
| 2005/0078762 A1* | 4/2005 | Ketchum | H04B 7/0417 |
| | | | 375/267 |
| 2009/0103648 A1* | 4/2009 | Fukuoka | H04L 5/0044 |
| | | | 375/267 |
| 2009/0232239 A1* | 9/2009 | Ko | H04L 5/005 |
| | | | 375/260 |
| 2011/0038320 A1* | 2/2011 | Chun | H04B 7/024 |
| | | | 370/328 |
| 2011/0170502 A1 | 7/2011 | Iwai et al. | |

OTHER PUBLICATIONS

Luo et al., "Performance Comparison of SC-FDMA-CDMA and OFDM-CDMA Systems for Uplink", International Conference on Consumer Electronics, Communications and Networks, May 16, 2011, p. 1475-1479.

Metkarunchit, "Enhanced Performance of DFTs-OFDM-CDMA System using Interleave Spreading Code", 2016 5th International Conference on Modern Circuits and Systems Technologies (MOCAST), Jun. 23, 2016, 4 pages.

Office Action dated May 9, 2017 for Japanese Patent Application No. 2017-502747.

\* cited by examiner

| MULTIPLEXED SYMBOL PAIR | REQUIRED TRANSMISSION QUALITY |
|---|---|
| 801, 802 | 1ST (HIGH QUALITY) |
| 803, 804 | 2ND |
| ⋮ | ⋮ |
| 811, 812 | 6TH (LOW QUALITY) |

TRANSMISSION APPARATUS AND TRANSMISSION METHOD

FIELD

The present invention relates to a transmission apparatus and to a transmission method that perform wireless communication using an orthogonal frequency division multiplexing (OFDM) scheme.

BACKGROUND

In an OFDM scheme, i.e., an orthogonal frequency division multiplexing scheme, a transmission apparatus allocates different pieces of data to multiple subcarriers that are orthogonal carriers to transmit data. The subcarriers used in an OFDM scheme are narrowband. Thus, an occurrence of frequency-selective fading may cause a transmission error in data allocated to a subcarrier having a low reception electric field intensity, but it does not cause a transmission error in data allocated to a subcarrier having a high reception electric field intensity. Non-Patent Literature 1 discloses a technology for improving transmission quality by application of interleaving and an error correction code in a transmission apparatus to correct a transmission error caused by frequency-selective fading.

CITATION LIST

Non-Patent Literature

Non-Patent Literature 1: ITAMI, Makoto, "Wakariyasui OFDM gijutsu" [translation: An easy-to-understand introduction to OFDM technology], Ohmsha, Ltd., November 2005, pp. 123-128.

SUMMARY

Technical Problem

However, the foregoing conventional technology allows a transmission error to occur in many bits if the reception electric field intensity decreases in many subcarriers because of frequency-selective fading. This presents a problem in that use of an error correction method that provides a low code rate for improvement in transmission quality may reduce the transmission efficiency.

The present invention has been made in view of the foregoing, and it is an object of the present invention to provide a transmission apparatus capable of improving transmission efficiency without a reduction in frequency-selective fading resistance.

Solution to Problem

To solve the problem and achieve the object described above, an aspect of the present invention is directed to a transmission apparatus that performs transmission using an orthogonal frequency division multiplexing scheme in one or a plurality of frequency bands. The transmission apparatus includes a symbol multiplexing unit to multiply a column vector containing a first number of modulated symbols generated by primary modulation in a frequency domain, by a precoding matrix having as many rows and columns as the first number to generate a multiplexed symbol group containing the first number of multiplexed symbols each containing a second number of the modulated symbols that are multiplexed, where the first number is two or more, and the second number is equal to or more than two and equal to or less than the first number. The transmission apparatus further includes a subcarrier allocation unit to allocate the multiplexed symbols contained in the multiplexed symbol group to different subcarriers.

Advantageous Effects of Invention

A transmission apparatus according to the present invention provides an advantage in that transmission efficiency can be improved without a reduction in frequency-selective fading resistance.

DESCRIPTION OF EMBODIMENTS

Transmission apparatuses and transmission methods according to embodiments of the present invention will be described in detail below with reference to the drawings. Note that these embodiments are not intended to limit the scope of this invention.

First Embodiment

Figure 1:
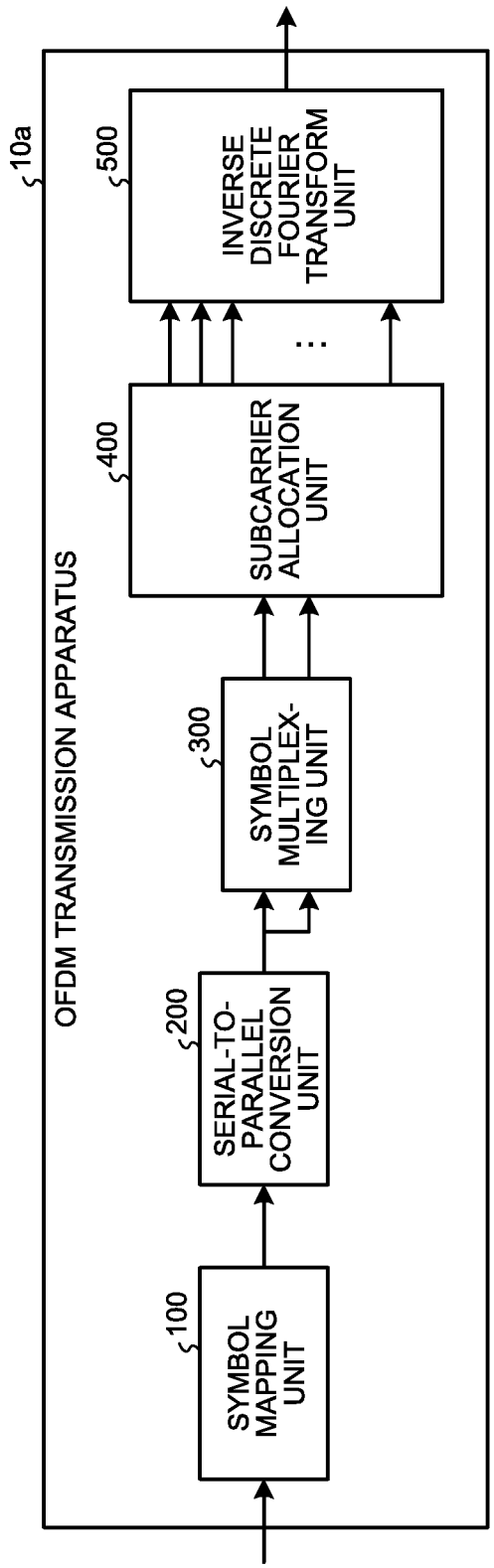
FIG. 1 is a block diagram illustrating an example configuration of an OFDM transmission apparatus according to a first embodiment.

FIG. 1 is a block diagram illustrating an example configuration of an OFDM transmission apparatus 10a according to a first embodiment of the present invention. The OFDM transmission apparatus 10a includes a symbol mapping unit 100, a serial-to-parallel conversion unit 200, a symbol multiplexing unit 300, a subcarrier allocation unit 400, and an inverse discrete Fourier transform unit 500. The OFDM transmission apparatus 10a is a transmission apparatus that performs transmission using one frequency band in an OFDM scheme, i.e., using one OFDM symbol.

The symbol mapping unit 100 performs primary modulation in a frequency domain on a bit series input from an upstream block (not illustrated) to generate a modulated symbol, and outputs, to the serial-to-parallel conversion unit 200, the modulated symbol generated. The primary modulation can be performed using a publicly known, existing technology such as binary phase shift keying (BPSK) modulation, quadrature phase shift keying (QPSK) modulation, 16-quadrature amplitude modulation (QAM) modulation, or 64-QAM modulation. Error correction coding may have already been performed on the bit series input to the symbol mapping unit 100.

The serial-to-parallel conversion unit 200 outputs M modulated symbols per OFDM symbol input from the symbol mapping unit 100, to the symbol multiplexing unit 300 such that L modulated symbols are output in parallel each time, where M represents the number of subcarriers per OFDM symbol and L satisfies $2 \leq L \leq M$. For serial-to-parallel conversion, the serial-to-parallel conversion unit 200 may sequentially output the input modulated symbols in time sequence such that L modulated symbols are output each time, or it may include a memory to store M modulated symbols, convert L temporally-separated modulated symbols into a parallel format, and output the L modulated symbols in parallel. As used herein, L is a first number and M is a third number.

The symbol multiplexing unit 300 multiplies an L-element column vector containing L modulated symbols that are input in parallel from the serial-to-parallel conversion unit 200 by an L-row by L-column (L×L) precoding matrix to generate L multiplexed symbols, and outputs a multiplexed symbol group containing the L multiplexed symbols generated, to the subcarrier allocation unit 400 such that L multiplexed symbols are output in parallel. At L=2, the precoding matrix becomes a two-row by two-column (2×2) matrix, and is given, for example, by Formula (1) using an arbitrary parameter $\alpha$.

[Formula 1]
$$\begin{pmatrix} \sqrt{\alpha} & -\sqrt{1-\alpha} \\ \sqrt{1-\alpha} & \sqrt{\alpha} \end{pmatrix} \quad (1)$$

The precoding matrix is not limited to the one expressed by Formula (1), but may also be any matrix that causes the sum of power values of the two modulated symbols before the multiplication by the precoding matrix to match the sum of power values of the two multiplexed symbols after the multiplication by the precoding matrix. Also when the value of L is three or more, the precoding matrix may similarly be any L×L matrix that causes the sum of power values of the L modulated symbols before the multiplication by the precoding matrix to match the sum of power values of the L multiplexed symbols after the multiplication by the precoding matrix.

This also means that such precoding matrix causes the power values of the L modulated symbols before the multiplication by the precoding matrix to match the power values of the respective modulated symbol elements obtained by conversion, into power values, of the L multiplexed symbols calculated by the multiplication by the precoding matrix.

The subcarrier allocation unit 400 allocates the multiplexed symbols contained in the multiplexed symbol group input from the symbol multiplexing unit 300 to respective different subcarriers. Specifically, the subcarrier allocation unit 400 allocates the L multiplexed symbols input in parallel from the symbol multiplexing unit 300 to consecutive L subcarriers in ascending order of the subcarrier number. After completion of allocation of the multiplexed symbols corresponding to one OFDM symbol, i.e., M multiplexed symbols, to the respective subcarriers, the subcarrier allocation unit 400 outputs the M multiplexed symbols to the inverse discrete Fourier transform unit 500 in parallel.

The inverse discrete Fourier transform unit 500 performs inverse discrete Fourier transform on the M multiplexed symbols input from the subcarrier allocation unit 400 to generate an OFDM symbol, and outputs the generated OFDM symbol to a downstream block (not illustrated).

Figure 2:
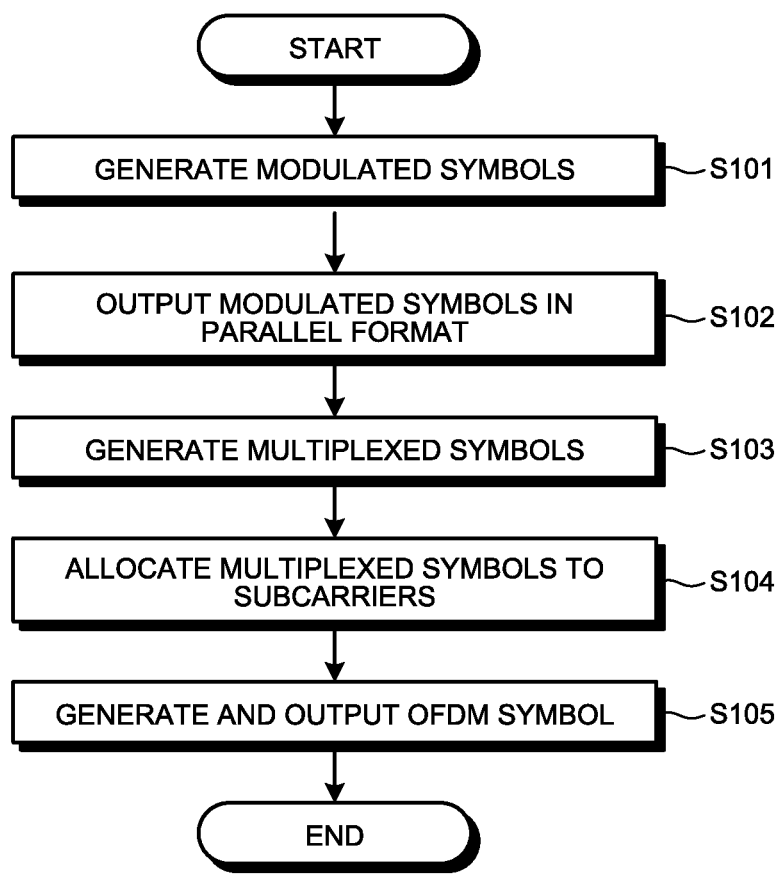
FIG. 2 is a flowchart illustrating OFDM symbol transmission processing performed by the OFDM transmission apparatus according to the first embodiment.

An operation of the OFDM transmission apparatus 10*a* of generating an OFDM symbol from a bit series and of sending the OFDM symbol will next be described. FIG. 2 is a flowchart illustrating OFDM symbol transmission processing performed by the OFDM transmission apparatus 10*a* according to the first embodiment. In the OFDM transmission apparatus 10*a*, firstly, the symbol mapping unit 100 performs primary modulation on a bit series to generate modulated symbols (step S101). The serial-to-parallel conversion unit 200 converts the modulated symbols into a parallel format, and outputs the modulated symbols such that L modulated symbols are output in parallel each time in this example (step S102). The symbol multiplexing unit 300 multiplies an L-element column vector containing the L modulated symbols input in parallel, by an L×L precoding matrix to generate L multiplexed symbols (step S103). The subcarrier allocation unit 400 allocates, to M subcarriers, the multiplexed symbols that are input such that L modulated symbols are output in parallel each time (step S104). The inverse discrete Fourier transform unit 500 performs inverse discrete Fourier transform on the M multiplexed symbols to generate an OFDM symbol, and outputs the OFDM symbol (step S105).

Figure 3:
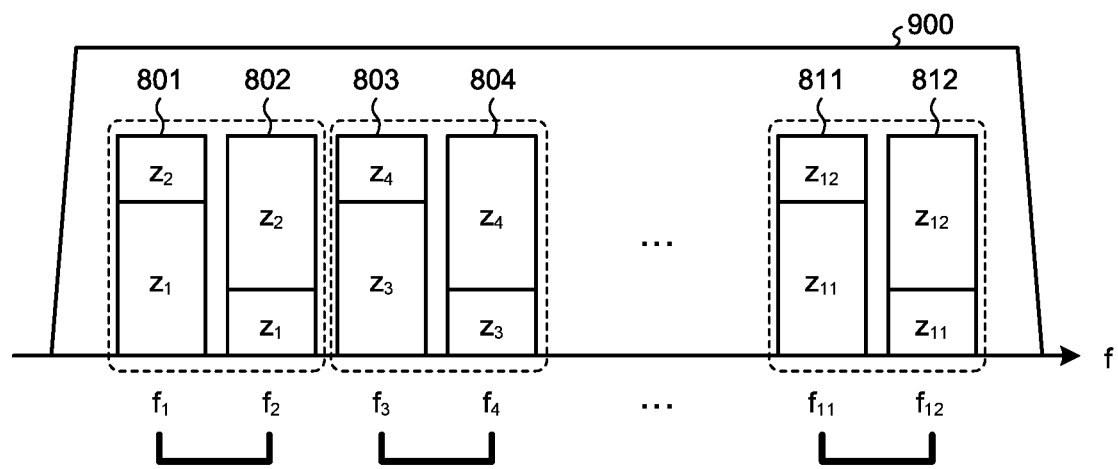
FIG. 3 is a diagram illustrating an example of multiplexed symbols generated in a symbol multiplexing unit and allocation of the multiplexed symbols to subcarriers performed in a subcarrier allocation unit according to the first embodiment.

Operations of the symbol multiplexing unit 300 and of the subcarrier allocation unit 400 will be described in detail below with the assumption that L=2 and M=12. FIG. 3 is a diagram illustrating an example of the multiplexed symbols generated in the symbol multiplexing unit 300 and allocation of the multiplexed symbols to the subcarriers performed in the subcarrier allocation unit 400 according to the first embodiment. In FIG. 3, the reference characters 801 to 812 indicate the multiplexed symbols generated in the symbol multiplexing unit 300, and the reference characters $f_1$ to $f_{12}$ indicate the subcarriers included in an OFDM symbol. The reference character 900 indicates the frequency band used for sending the OFDM symbol.

The symbol multiplexing unit 300 multiplies a column vector containing two modulated symbols $z_1$ and $z_2$ input in parallel from the serial-to-parallel conversion unit 200, by the 2×2 precoding matrix given by Formula (1) to generate two multiplexed symbols 801 and 802. In this example, the multiplexed symbol 801 contains the modulated symbols $z_1$ and $z_2$ multiplexed at a ratio of $\alpha:(1-\alpha)$, and the multiplexed symbol 802 contains the modulated symbols $z_1$ and $z_2$ multiplexed at a ratio of $(1-\alpha):\alpha$.

The symbol multiplexing unit 300 also multiplies a column vector containing modulated symbols $z_3$ and $z_4$, a column vector containing modulated symbols $z_5$ and $z_6$, a column vector containing modulated symbols $z_7$ and $z_8$, a column vector containing modulated symbols $z_9$ and $z_{10}$, and a column vector containing modulated symbols $z_{11}$ and $z_{12}$, each by the precoding matrix, in a similar manner. The symbol multiplexing unit 300 generates two multiplexed symbols 803 and 804 from the two modulated symbols $z_3$ and $z_4$, two multiplexed symbols 805 and 806 from the two modulated symbols $z_5$ and $z_6$, two multiplexed symbols 807 and 808 from the two modulated symbols $z_7$ and $z_8$, two multiplexed symbols 809 and 810 from the two modulated symbols $z_9$ and $z_{10}$, and two multiplexed symbols 811 and 812 from the two modulated symbols $z_{11}$ and $z_{12}$. For simplicity of illustration, FIG. 3 omits some of the multiplexed symbols and subcarriers. Other figures thereafter also use a similar illustration.

Figure 4:
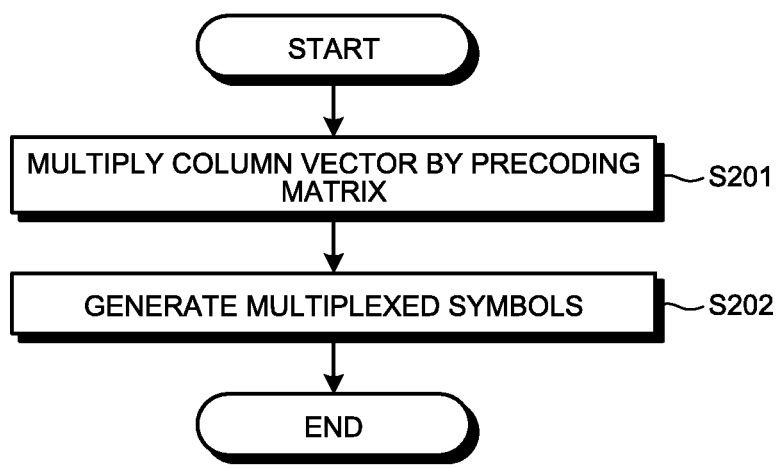
FIG. 4 is a flowchart illustrating an example of an operation of the symbol multiplexing unit according to the first embodiment.

FIG. 4 is a flowchart illustrating an example of an operation of the symbol multiplexing unit 300 according to the first embodiment. The symbol multiplexing unit 300 multiplies a column vector containing the modulated symbols input in parallel from the serial-to-parallel conversion unit 200 by a 2×2 precoding matrix (step S201), and generates multiplexed symbols (step S202).

The subcarrier allocation unit 400 allocates the two multiplexed symbols 801 and 802 input in parallel from the symbol multiplexing unit 300 respectively to the consecutive subcarriers $f_1$ and $f_2$. Similarly, the subcarrier allocation unit 400 allocates the multiplexed symbols 803 and 804 input in parallel, respectively to the consecutive subcarriers $f_3$ and $f_4$; allocates the multiplexed symbols 805 and 806 input in parallel, respectively to the consecutive subcarriers $f_5$ and $f_6$, allocates the multiplexed symbols 807 and 808 input in parallel, respectively to the consecutive subcarriers $f_7$ and $f_8$; allocates the multiplexed symbols 809 and 810 input in parallel, respectively to the consecutive subcarriers $f_9$ and $f_{10}$; and allocates the multiplexed symbols 811 and 812 input in parallel, respectively to the consecutive subcarriers $f_{11}$ and $f_{12}$.

As described above, according to the present embodiment, the OFDM transmission apparatus 10a multiplies a column vector containing multiple modulated symbols generated by primary modulation, by a precoding matrix to generate multiple multiplexed symbols. The OFDM transmission apparatus 10a allocates the multiple multiplexed symbols generated, to respective different subcarriers. Thus, the OFDM transmission apparatus 10a can transmit any one of the modulated symbol elements using multiple subcarriers, and transmit multiple modulated symbols using any one of the subcarriers. This enables the OFDM transmission apparatus 10a to reduce the number of modulated symbols that suffer from a transmission error upon occurrence of a transmission error in a particular subcarrier due to frequency-selective fading when compared with a case where one modulated symbol is transmitted on one subcarrier. Thus, the OFDM transmission apparatus 10a can apply error correction that provides a high code rate, and can thereby improve the transmission efficiency without a reduction in frequency-selective fading resistance.

Although the description above assumes that the subcarrier allocation unit 400 allocates L multiplexed symbols input in parallel from the symbol multiplexing unit 300 to consecutive L subcarriers, the allocation operation of the subcarrier allocation unit 400 is not limited thereto. As another example of the subcarrier allocation, the subcarrier allocation unit 400 may allocate the L multiplexed symbols input in parallel to subcarriers separated from each other by M/L subcarriers, where M/L is a fourth number.

Figure 5:
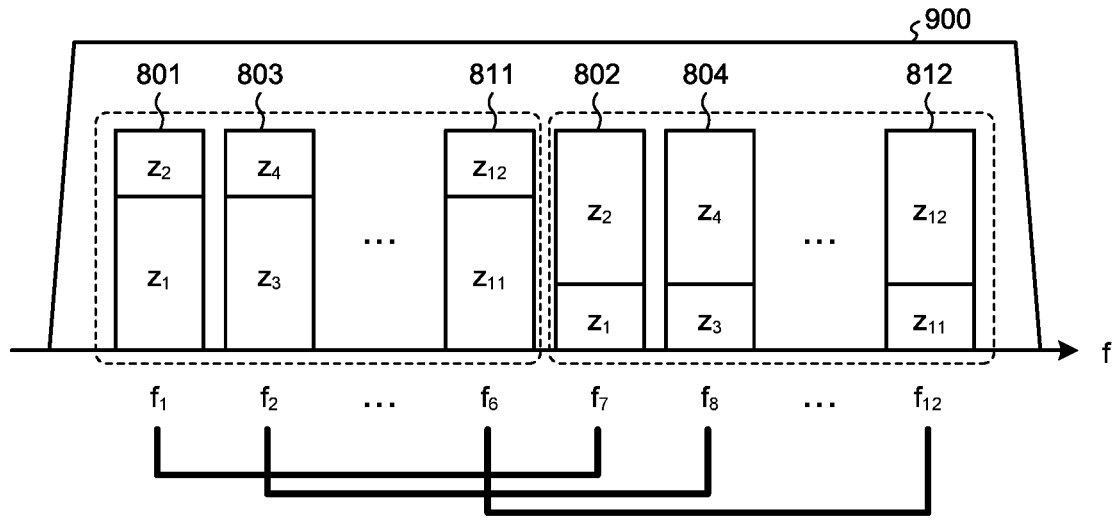
FIG. 5 is a diagram illustrating another example of multiplexed symbols generated in the symbol multiplexing unit and allocation of the multiplexed symbols to subcarriers performed in the subcarrier allocation unit according to the first embodiment.

FIG. 5 is a diagram illustrating another example of multiplexed symbols generated in the symbol multiplexing unit 300 and allocation of the multiplexed symbols to subcarriers performed in the subcarrier allocation unit 400 according to the first embodiment. For example, at L=2 and M=12, the subcarrier allocation unit 400 allocates, as illustrated in FIG. 5, the two multiplexed symbols 801 and 802 input in parallel respectively to the subcarriers $f_1$ and $f_7$ separated from each other by 12/2=6 subcarriers. Similarly, the subcarrier allocation unit 400 allocates the multiplexed symbols 803 and 804 input in parallel respectively to the subcarriers $f_2$ and $f_8$, allocates the multiplexed symbols 805 and 806 input in parallel respectively to the subcarriers $f_3$ and $f_9$, allocates the multiplexed symbols 807 and 808 input in parallel respectively to the subcarriers $f_4$ and $f_{10}$, allocates the multiplexed symbols 809 and 810 input in parallel respectively to the subcarriers $f_5$ and $f_{11}$, and allocates the multiplexed symbols 811 and 812 input in parallel respectively to the subcarriers $f_6$ and $f_{12}$.

Specifically, if the operation of transmission of an OFDM symbol uses one frequency band and the OFDM symbol contains M subcarriers, where M is greater than L, the subcarrier allocation unit 400 allocates the L multiplexed symbols contained in one multiplexed symbol group to subcarriers separated from each other by M/L subcarriers. As described above, the OFDM transmission apparatus 10a allocates the multiple multiplexed symbols each formed of the same set of modulated symbols to subcarriers widely separated from each other. This allows the OFDM transmission apparatus 10a to allocate multiplexed symbols each containing the same set of modulated symbols to subcarriers having a small frequency correlation therebetween, thereby to further reduce the effect of frequency-selective fading.

The description above assumes that the subcarrier allocation unit 400 allocates the input multiplexed symbols to subcarriers in time sequence in ascending order of the subcarrier number starting from the lowest frequency subcarrier. However, the allocation operation of the subcarrier allocation unit 400 is not limited thereto. For example, a similar advantage is provided if, in FIG. 3, the subcarrier allocation unit 400 allocates the multiplexed symbol 801 to the subcarrier $f_3$ and allocates the multiplexed symbol 802 to the subcarrier $f_4$. Similarly, a similar advantage is also provided if, in FIG. 5, the subcarrier allocation unit 400 allocates the multiplexed symbol 801 to the subcarrier $f_2$ and allocates the multiplexed symbol 802 to the subcarrier $f_8$.

Moreover, the description above assumes that the number of modulated symbols input in parallel, the numbers of rows and columns of the precoding matrix, and the number of modulated symbols contained in each multiplexed symbol are all L in the operation of the symbol multiplexing unit 300. However, these numbers are not limited to L.

For example, the symbol multiplexing unit 300 may generate L K-element column vectors each containing a different combination of K modulated symbols among L modulated symbols input in parallel. The symbol multiplexing unit 300 may multiply each of the L column vectors by a K×K precoding matrix. The symbol multiplexing unit 300 may then select one element from each of the L K-element column vectors generated by the multiplication of each of the L column vectors by the K×K precoding matrix to generate L multiplexed symbols, i.e., a multiplexed symbol group containing L multiplexed symbols. As used herein, K is a second number, and satisfies K<L. The case of K=L is the case in which, as described above, the number of modulated symbols input in parallel, the numbers of rows and columns of the precoding matrix, and the number of modulated symbols contained in each multiplexed symbol are all identical.

In this case, each of the L multiplexed symbols contains K modulated symbols. The case of L=3 and K=2 will be described below as an example. The symbol multiplexing unit 300 generates three column vectors $(z_1, z_2)^T$, $(z_2, z_3)^T$, and $(z_3, z_1)^T$ from the three modulated symbols $z_1$, $z_2$, and $z_3$ input in parallel, where $(.)^T$ represents a transposed matrix. As used herein, the three column vectors $(z_1, z_2)^T$, $(z_2, z_3)^T$, and $(z_3, z_1)^T$ are each referred to as first column vector. The symbol multiplexing unit 300 multiplies each of the three first column vectors by the precoding matrix given by Formula (1).

The symbol multiplexing unit 300 selects, as the multiplexed symbols, the first elements $z_1 \times \sqrt{\alpha} - z_2 \times \sqrt{(1-\alpha)}$, $z_2 \times \sqrt{\alpha} - z_3 \times \sqrt{(1-\alpha)}$, and $z_3 \times \sqrt{\alpha} - z_1 \times \sqrt{(1-\alpha)}$ respectively from three column vectors $(z_1 \times \sqrt{\alpha} - z_2 \times \sqrt{(1-\alpha)}, z_1 \times \sqrt{(1-\alpha)} + z_2 \times \sqrt{\alpha})^T$, $(z_2 \times \sqrt{\alpha} - z_3 \times \sqrt{(1-\alpha)}, z_2 \times \sqrt{(1-\alpha)} + z_3 \times \sqrt{\alpha})^T$, and $(z_3 \times \sqrt{\alpha} - z_1 \times \sqrt{(1-\alpha)}, z_3 \times \sqrt{(1-\alpha)} + z_1 \times \sqrt{\alpha})^T$ respectively calculated by multiplication of the three first column vectors by the precoding matrix given by Formula (1). As used herein, the three column vectors $(z_1 \times \sqrt{\alpha} - z_2 \times \sqrt{(1-\alpha)}, z_1 \times \sqrt{(1-\alpha)} + z_2 \times \sqrt{\alpha})^T$, $(z_2 \times \sqrt{\alpha} - z_3 \times \sqrt{(1-\alpha)}, z_2 \times \sqrt{(1-\alpha)} + z_3 \times \sqrt{\alpha})^T$, and $(z_3 \times \sqrt{\alpha} - z_1 \times \sqrt{(1-\alpha)}, z_3 \times \sqrt{(1-\alpha)} + z_1 \times \sqrt{\alpha})^T$ are each referred to as second column vector. The symbol multiplexing unit 300 selects elements from the L second column vectors such that each of the L modulated symbols is contained in the L multiplexed symbols as an element thereof. The symbol multiplexing unit 300 then outputs the three multiplexed symbols selected, to the subcarrier allocation unit 400 in parallel.

The symbol multiplexing unit 300 selects the first elements from the three second column vectors calculated by multiplication by the precoding matrix, using the precoding matrix of Formula (1). This operation is equivalent to an operation in which the symbol multiplexing unit 300 selects elements from the L second column vectors such that the sum of power values of the L modulated symbols before the multiplication by the precoding matrix matches the sum of power values of the L multiplexed symbols.

Figure 6:
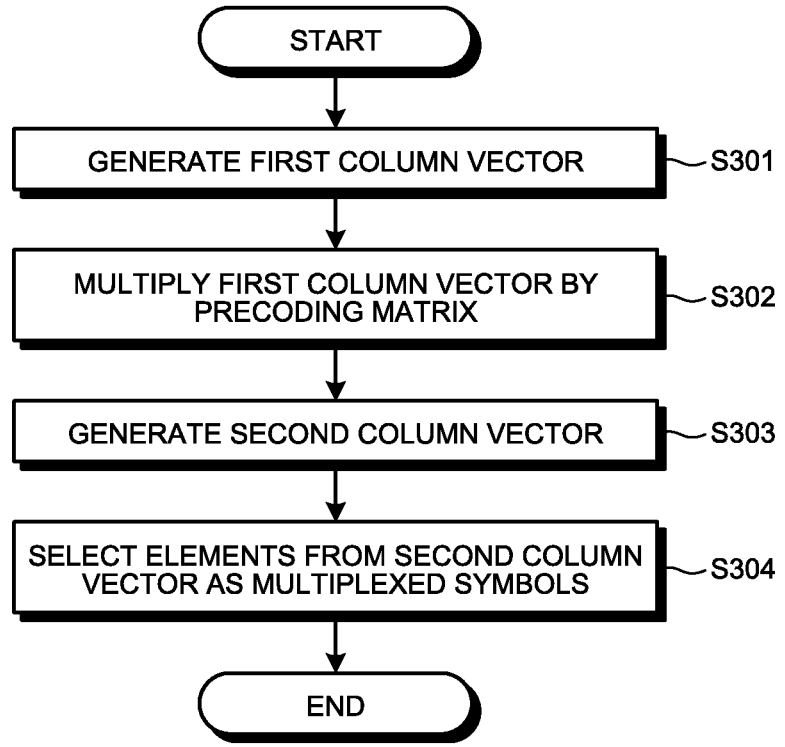
FIG. 6 is a flowchart illustrating another example of an operation of the symbol multiplexing unit according to the first embodiment.

FIG. 6 is a flowchart illustrating another example of an operation of the symbol multiplexing unit 300 according to the first embodiment. The symbol multiplexing unit 300 generates a first column vector from the modulated symbols input in parallel from the serial-to-parallel conversion unit 200 (step S301). The symbol multiplexing unit 300 multiplies the first column vector by a 2×2 precoding matrix (step S302), and generates a second column vector (step S303). The symbol multiplexing unit 300 selects an element from the second column vector, and uses the selected element as a multiplexed symbol (step S304).

This method of selecting elements is equivalent to a method in which the symbol multiplexing unit 300 selects elements from the L second column vectors such that the power values of the L modulated symbols before the multiplication by the precoding matrix match the power values of the respective modulated symbol elements obtained by conversion, into power values, of the L multiplexed symbols. Note that the method of generating a column vector containing modulated symbols to be multiplied by the precoding matrix, and the method of selecting a multiplexed symbol from the column vector after the multiplication by the precoding matrix are not limited to those described above.

Moreover, as another example different from the operation described above to generate L K-element column vectors, the symbol multiplexing unit 300 may generate L multiplexed symbols by multiplication of an L-element column vector containing L modulated symbols input in parallel by a precoding matrix containing (L-K) zero-elements in each row and in each column. In this case, each of the L multiplexed symbols contains K modulated symbols. The case of L=3 and K=2 will be described below as an example. Formula (2) provides a precoding matrix containing 1 element (i.e., 3−2=1) that is 0 in each row and in each column.

[Formula 2]

$$\begin{pmatrix} \sqrt{\alpha} & \sqrt{1-\alpha} & 0 \\ 0 & \sqrt{\alpha} & \sqrt{1-\alpha} \\ \sqrt{1-\alpha} & 0 & \sqrt{\alpha} \end{pmatrix} \quad (2)$$

The symbol multiplexing unit 300 multiplies a column vector $(z_1, z_2, z_3)^T$ containing the three modulated symbols $z_1$, $z_2$, and $z_3$ input in parallel by the precoding matrix of Formula (2). The symbol multiplexing unit 300 selects each element of the three-element column vector calculated by multiplication of the column vector $(z_1, z_2, z_3)^T$ by the precoding matrix of Formula (2), as a multiplexed symbol. The symbol multiplexing unit 300 outputs the three multiplexed symbols selected, to the subcarrier allocation unit 400 in parallel.

As described above, by imposing a limitation on the number of modulated symbols contained in one multiplexed symbol by the OFDM transmission apparatus 10a, it is possible to simplify the demodulation processing in a peer device that is a reception apparatus (not illustrated). This similarly applies to the operations in the later embodiments.

A hardware configuration of the OFDM transmission apparatus 10a will next be described. The components of the OFDM transmission apparatus 10a are implemented in a processing circuit. That is, the OFDM transmission apparatus 10a includes a processing circuit for performing primary modulation on a bit series using an arbitrary modulation technique, performing symbol multiplexing processing on multiple modulated symbols, allocating multiplexed symbols to subcarriers, and performing inverse discrete Fourier transform on the multiplexed symbols allocated to the subcarriers thus to generate an OFDM symbol. The processing circuit may be a combination of a central processing unit (CPU) that executes a program stored in a memory and the memory, or may be a dedicated hardware element.

Figure 7:
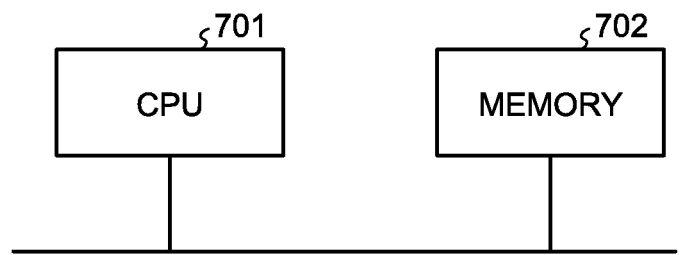
FIG. 7 is a diagram illustrating of an example of a processing circuit of the OFDM transmission apparatus according to the first embodiment in a case in which the operation circuit is configured from a CPU and a memory.

FIG. 7 is a diagram illustrating an example of a processing circuit of the OFDM transmission apparatus 10a according to the first embodiment in a case in which the operation circuit is configured from a CPU and a memory. In the case in which the processing circuit is configured from a CPU 701 and a memory 702, the functions of the OFDM transmission apparatus 10a are implemented in software, firmware, or a combination of software and firmware. The software or firmware is described in a form of a program and is stored in the memory 702. In the processing circuit, the CPU 701 reads and executes a program stored in the memory 702 to provide the functions. That is, the OFDM transmission apparatus 10a includes the memory 702 for storing programs that, upon execution by the processing circuit, cause the processing circuit to perform a step of performing primary modulation on a bit series using an arbitrary modulation technique, a step of performing symbol multiplexing processing on multiple modulated symbols, a step of allocating multiplexed symbols to subcarriers, and a step of performing inverse discrete Fourier transform on the multiplexed symbols allocated to the subcarriers to generate an OFDM symbol. It can also be said that these programs cause the computer to perform the procedure and method of the OFDM transmission apparatus 10a. In this example, the CPU 701 may also be a processing device, a computing unit, a microprocessor, a microcomputer, a processor, a digital signal processor (DSP), or the like. The memory 702 may be, for example, a non-volatile or volatile semiconductor memory, such as a random access memory (RAM), a read-only memory (ROM), a flash memory, an erasable programmable ROM (EPROM), an electrically erasable programmable ROM (EEPROM); a magnetic disk, a flexible disk, an optical disk, a compact disc, a MiniDisc, a digital versatile disc (DVD), or the like.

Figure 8:
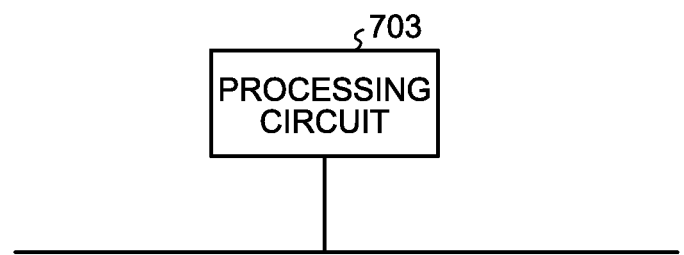
FIG. 8 is a diagram illustrating of an example of a processing circuit of the OFDM transmission apparatus according to the first embodiment in a case in which the operation circuit is configured from a dedicated hardware element.

FIG. 8 is a diagram illustrating an example of a processing circuit of the OFDM transmission apparatus 10a according to the first embodiment in a case in which the operation circuit is configured from a dedicated hardware element. In the case in which the processing circuit is a dedicated hardware element, a processing circuit 703 illustrated in FIG. 8 may be, for example, a single circuit, a set of multiple circuits, a programmed processor, a parallel-programmed processor, an application specific integrated circuit (ASIC), a field programmable gate array (FPGA), or a combination thereof. The functions of the OFDM transmission apparatus l0a may be implemented in the processing circuit 703 in a function specific manner, or they may be implemented in the processing circuit 703 as a whole.

The functions of the OFDM transmission apparatus 10a may be implemented partly in a dedicated hardware element and partly in software or firmware. Thus, the processing circuit can provide the functions described above by a dedicated hardware element, software, firmware, or a combination thereof.

Second Embodiment

In the first embodiment, the subcarrier allocation unit 400 of the OFDM transmission apparatus 10*a* applies the same subcarrier allocation pattern to a set of the multiplexed symbols for each OFDM symbol. In a second embodiment, the subcarrier allocation pattern of the multiplexed symbols is changed for each OFDM symbol. Differences from the first embodiment will be described below.

Figure 9:
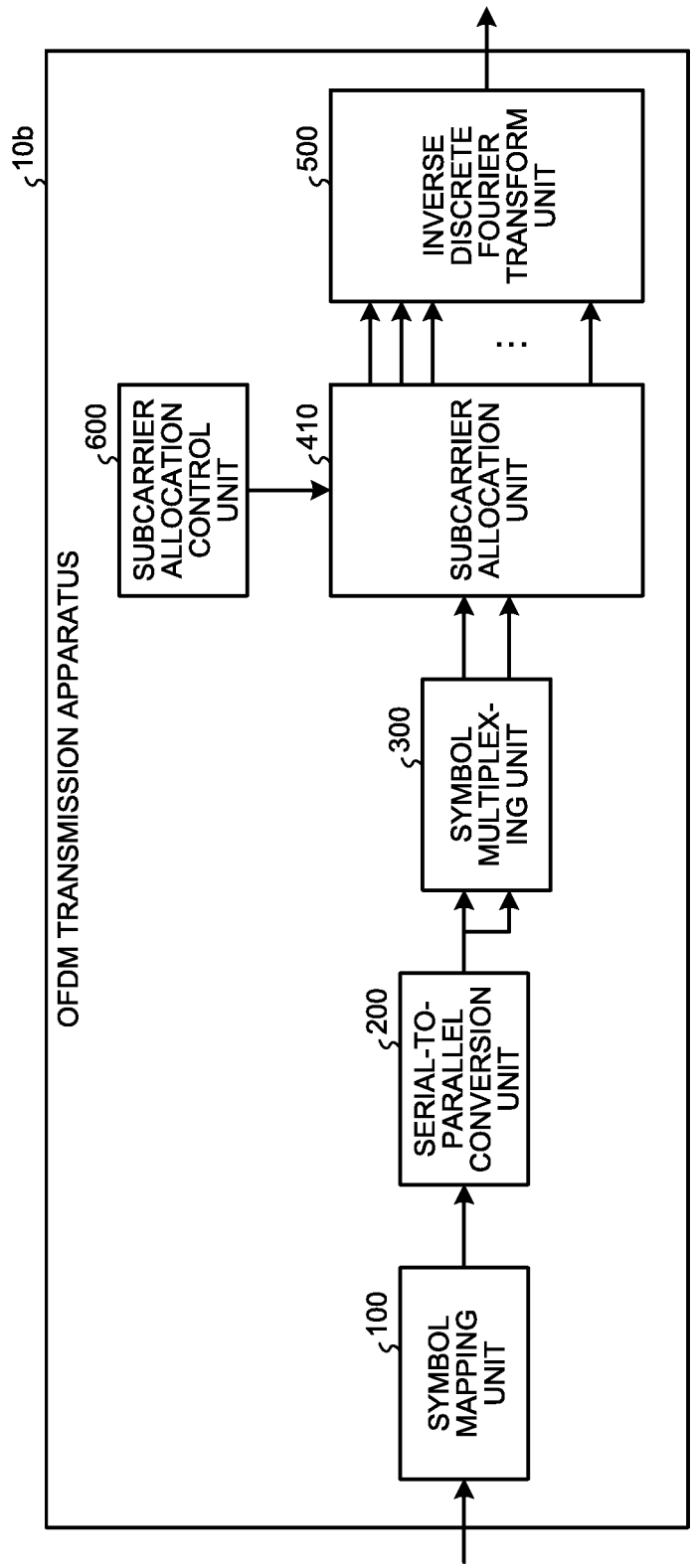
FIG. 9 is a block diagram illustrating an example configuration of an OFDM transmission apparatus according to a second embodiment.

FIG. 9 is a block diagram illustrating an example configuration of an OFDM transmission apparatus 10*b* according to the second embodiment. As compared with the OFDM transmission apparatus 10*a*, the OFDM transmission apparatus 10*b* is configured such that the subcarrier allocation unit 400 is removed and a subcarrier allocation unit 410 and a subcarrier allocation control unit 600 are added. The subcarrier allocation control unit 600 is connected to the subcarrier allocation unit 410. The OFDM transmission apparatus 10*b* is a transmission apparatus that performs transmission using one frequency band in an OFDM scheme, i.e., using one OFDM symbol.

The subcarrier allocation unit 410 changes the subcarrier to which a particular multiplexed symbol is allocated on the basis of an instruction from the subcarrier allocation control unit 600.

Figures 10, 11:
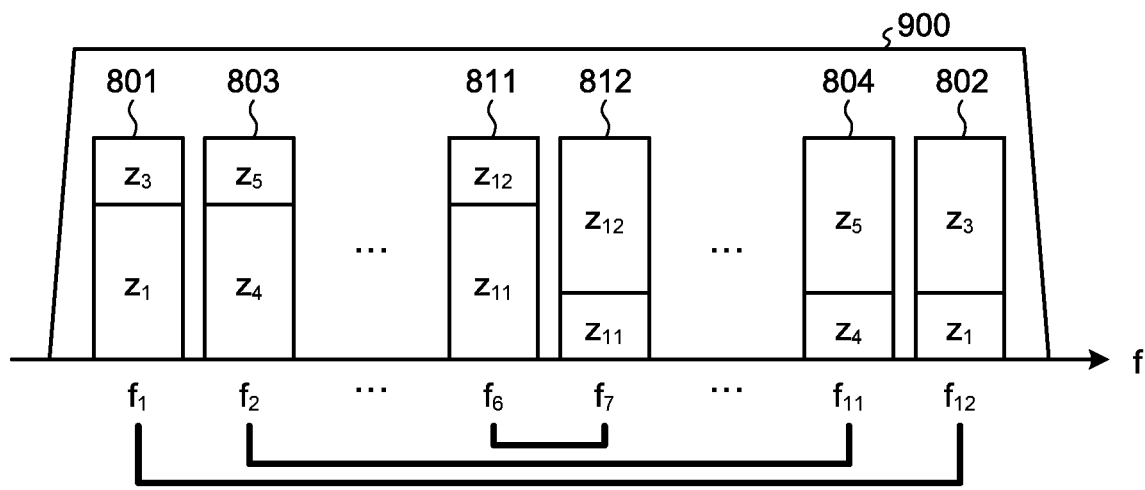
FIG. 10 is a chart illustrating an example of required transmission quality levels of multiplexed symbol pairs generated in the symbol multiplexing unit in the second embodiment.
FIG. 11 is a diagram illustrating an example of allocation of multiplexed symbols to subcarriers on the basis of an instruction from the subcarrier allocation control unit, performed by the subcarrier allocation unit of the OFDM transmission apparatus according to the second embodiment.

The subcarrier allocation control unit 600 indicates, to the subcarrier allocation unit 410, the subcarrier number of the subcarrier to which a particular multiplexed symbol is to be allocated. An operation of the subcarrier allocation control unit 600 will now be described in detail. For simplicity of illustration, the case of L=2 and M=12 will be described here. It is also assumed here that six multiplexed symbol groups generated in the symbol multiplexing unit 300, specifically, six multiplexed symbol pairs (801, 802), (803, 804), . . . , and (811, 812) have required transmission quality levels different from one another. FIG. 10 is a chart illustrating an example of required transmission quality levels of the multiplexed symbol pairs generated in the symbol multiplexing unit 300 in the second embodiment. It is assumed for example that the multiplexed symbol pair (801, 802) has the highest required transmission quality level, then the multiplexed symbol pair (803, 804) has the second-highest required transmission quality level, and the multiplexed symbol pair (811, 812) has the lowest required transmission quality level. Note that the required transmission quality levels of the multiplexed symbol pairs illustrated in FIG. 10 are listed to illustrate relative relationships between the required transmission quality levels for the six multiplexed symbol pairs assumed to be contained in an OFDM symbol that will be transmitted from the OFDM transmission apparatus 10*b*.

The subcarrier allocation control unit 600 stores information on the required transmission quality levels of the multiplexed symbol pairs illustrated in FIG. 10. The subcarrier allocation control unit 600 indicates, to the subcarrier allocation unit 410, the subcarrier number of the subcarrier to which a particular multiplexed symbol is to be allocated such that a multiplexed symbol pair having a high required transmission quality level is allocated to subcarriers relatively widely separated from each other.

FIG. 11 is a diagram illustrating an example of allocation of the multiplexed symbols to the subcarriers on the basis of an instruction from the subcarrier allocation control unit 600, performed by the subcarrier allocation unit 410 of the OFDM transmission apparatus 10*b* according to the second embodiment. As illustrated in FIG. 11, the subcarrier allocation control unit 600 controls the subcarrier allocation unit 410 such that the multiplexed symbol pair (801, 802) is allocated to the subcarriers $f_1$ and $f_{12}$ at both ends of the frequency band of the OFDM symbol; the multiplexed symbol pair (803, 804) is allocated to the subcarriers $f_2$ and $f_{11}$ respectively adjacent to the subcarriers to which the multiplexed symbol pair (801, 802) is allocated; and the multiplexed symbol pair (811, 812) is allocated to the subcarriers $f_6$ and $f_7$ adjacent to each other at the band center.

Based on the control by the subcarrier allocation control unit 600, the subcarrier allocation unit 410 allocates L multiplexed symbols contained in the multiplexed symbol group having a high required transmission quality level to subcarriers relatively widely separated from each other in the frequency direction, and allocates L multiplexed symbols contained in a multiplexed symbol group having a lower required transmission quality level than the required transmission quality level of the multiplexed symbol group having the high required transmission quality level, to subcarriers less separated from each other in the frequency direction than the subcarriers to which the L multiplexed symbols contained in the multiplexed symbol group having the high required transmission quality level are allocated.

Figure 12:
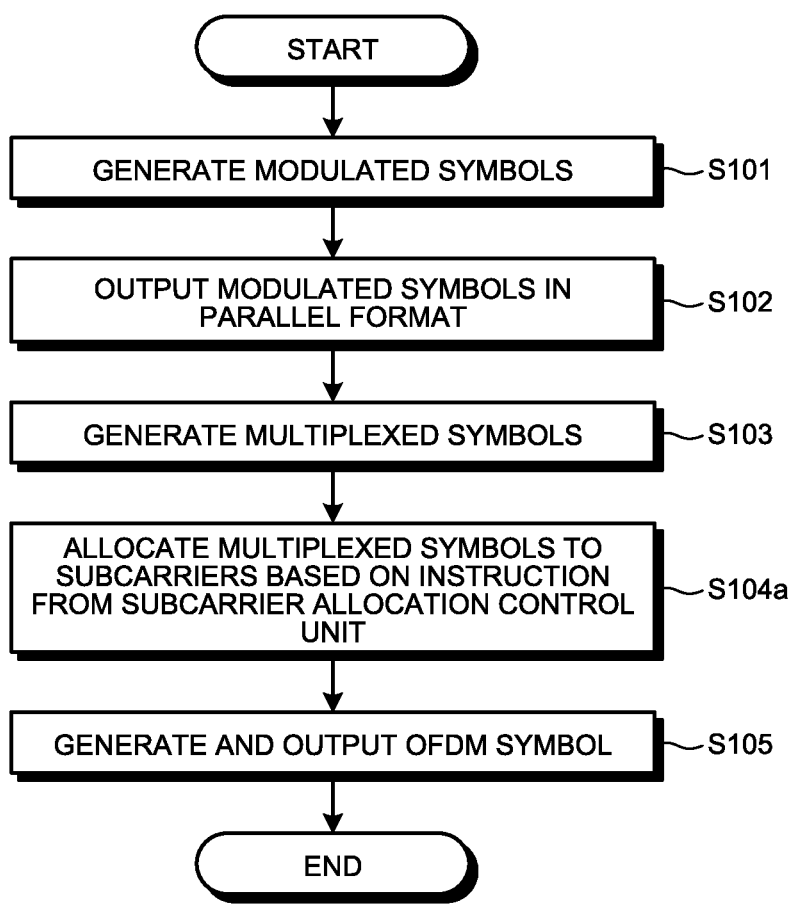
FIG. 12 is a flowchart illustrating OFDM symbol transmission processing performed by the OFDM transmission apparatus according to the second embodiment.

FIG. 12 is a flowchart illustrating OFDM symbol transmission processing performed by the OFDM transmission apparatus 10*b* according to the second embodiment. The processing at steps S101 to S103 and step at S105 is similar to that performed by the OFDM transmission apparatus 10*a* as illustrated in FIG. 2. In the OFDM transmission apparatus 10*b*, the subcarrier allocation unit 410 allocates L multiplexed symbols to L subcarriers on the basis of an instruction from the subcarrier allocation control unit 600 (step S104*a*).

As described above, the OFDM transmission apparatus 10*b* changes the interval between subcarriers to which multiple multiplexed symbols each containing the same set of modulated symbols are allocated depending on the required transmission quality level of the multiplexed symbol pair. Specifically, the OFDM transmission apparatus 10*b* allocates a multiplexed symbol pair having a high required transmission quality level to subcarriers relatively widely separated from each other, i.e., subcarriers having a small frequency correlation therebetween. This enables the OFDM transmission apparatus 10*b* to improve the transmission quality of a multiplexed symbol having a high required transmission quality level, i.e., the transmission quality of data having a high required transmission quality level.

The subcarrier allocation control unit 600 may control the subcarrier allocation unit 410 to change the subcarrier allocation pattern of a multiplexed symbol pair depending on the transmission timing. In this case, the subcarrier allocation control unit 600 controls the subcarrier allocation unit 410 such that the subcarrier allocation pattern of the multiplexed symbols is changed for each OFDM symbol. For simplicity of illustration, the case of L=2 and M=12 will be described here. As an example, a case will be described below in terms of a first OFDM symbol transmitted at time $t_1$ and a second OFDM symbol transmitted at time $t_2$.

Figure 13:
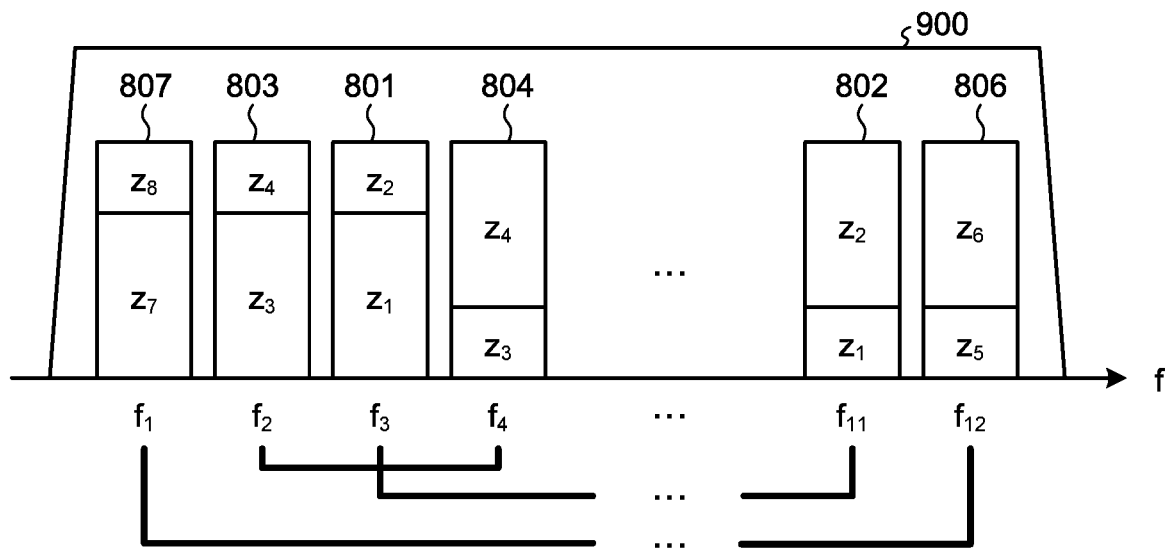
FIG. 13 is a diagram illustrating an example of allocation of multiplexed symbols to subcarriers performed at time $t_1$ by the OFDM transmission apparatus according to the second embodiment.
Figure 14:
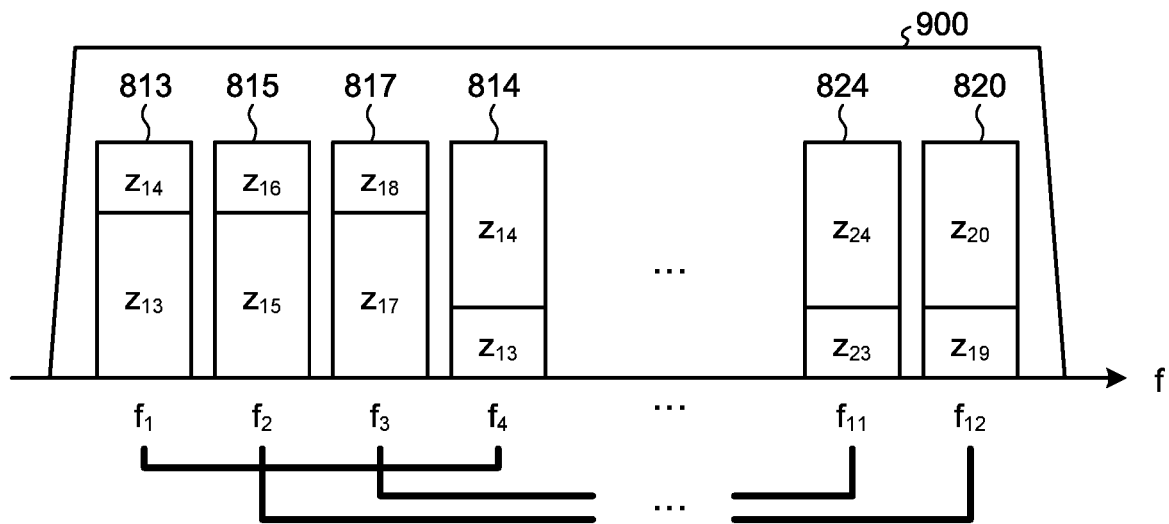
FIG. 14 is a diagram illustrating an example of allocation of multiplexed symbols to subcarriers performed at time $t_2$ by the OFDM transmission apparatus according to the second embodiment.

FIG. 13 is a diagram illustrating an example of allocation of multiplexed symbols to subcarriers performed at time $t_1$ by the OFDM transmission apparatus 10*b* according to the second embodiment. FIG. 14 is a diagram illustrating an example of allocation of multiplexed symbols to subcarriers performed at time $t_2$ by the OFDM transmission apparatus 10*b* according to the second embodiment. For the first OFDM symbol, the subcarrier allocation control unit 600 controls the subcarrier allocation unit 410 such that, as illustrated in FIG. 13, the multiplexed symbols 801 and 802 each containing the modulated symbols $z_1$ and $z_2$ are respectively allocated to the subcarriers $f_3$ and $f_{11}$. For the second OFDM symbol, the subcarrier allocation control unit 600 controls the subcarrier allocation unit 410 such that, as illustrated in FIG. 14, the multiplexed symbols 813 and 814 each containing the modulated symbols $z_{13}$ and $z_{14}$ are respectively allocated to the subcarriers $f_1$ and $f_4$.

In FIGS. 13 and 14, the modulated symbols $z_1$ and $z_{13}$ may be different data or the same data. In a case in which the modulated symbols $z_1$ and $z_{13}$ are the same data, the OFDM transmission apparatus 10b applies different subcarrier allocation patterns to the first OFDM symbol and the second OFDM symbol to consecutively transmit the same data. Note that the example of subcarrier allocation pattern of multiplexed symbols at each time point is not limited to the examples of FIGS. 13 and 14.

If the time variation of the propagation channel is small, the subcarrier allocation control unit 600 may change the subcarrier allocation pattern of multiplexed symbols at a time interval less than the time variation of the propagation channel. In regard to propagation channel information, if the communication system that communicates with the OFDM transmission apparatus 10b is a time division duplex (TDD) system, the OFDM transmission apparatus 10b may calculate propagation channel information on the basis of a reception signal received from a peer device (not illustrated). Otherwise, if the communication system that communicates with the OFDM transmission apparatus 10b is a frequency division duplex (FDD) system, the OFDM transmission apparatus 10b may cause a peer device (not illustrated) to feed propagation channel information measured in the peer device back to a reception device included in the OFDM transmission apparatus 10b, thus to obtain propagation channel information.

As described above, the OFDM transmission apparatus 10b changes the subcarrier allocation pattern of multiplexed symbols for each OFDM symbol. Specifically, the subcarrier allocation unit 410 changes the subcarriers to which the multiplexed symbols are to be allocated each time an OFDM symbol is output in the frequency band under the control of the subcarrier allocation control unit 600. This operation enables the OFDM transmission apparatus 10b to randomize the transmission error pattern so as to improve the effect of error correction even when the time variation of the propagation channel is small and the reception electric field intensity of the same subcarrier decreases for a long time due to an effect of frequency-selective fading. Moreover, in a case in which a data sequence is consecutively transmitted using multiple OFDM symbols, the operation above enables the OFDM transmission apparatus 10b to reduce the probability that multiplexed symbols each containing the same set of modulated symbols temporally continuously suffer from a transmission error, thereby enabling the effect of error correction to be improved.

The OFDM transmission apparatus 10b may be configured using hardware elements similar to the hardware elements of the OFDM transmission apparatus 10a described above.

Third Embodiment

In a third embodiment, a modulated symbol is spread using a spreading code depending on the required transmission quality level of that modulated symbol. Differences from the second embodiment will be described below.

Figure 15:
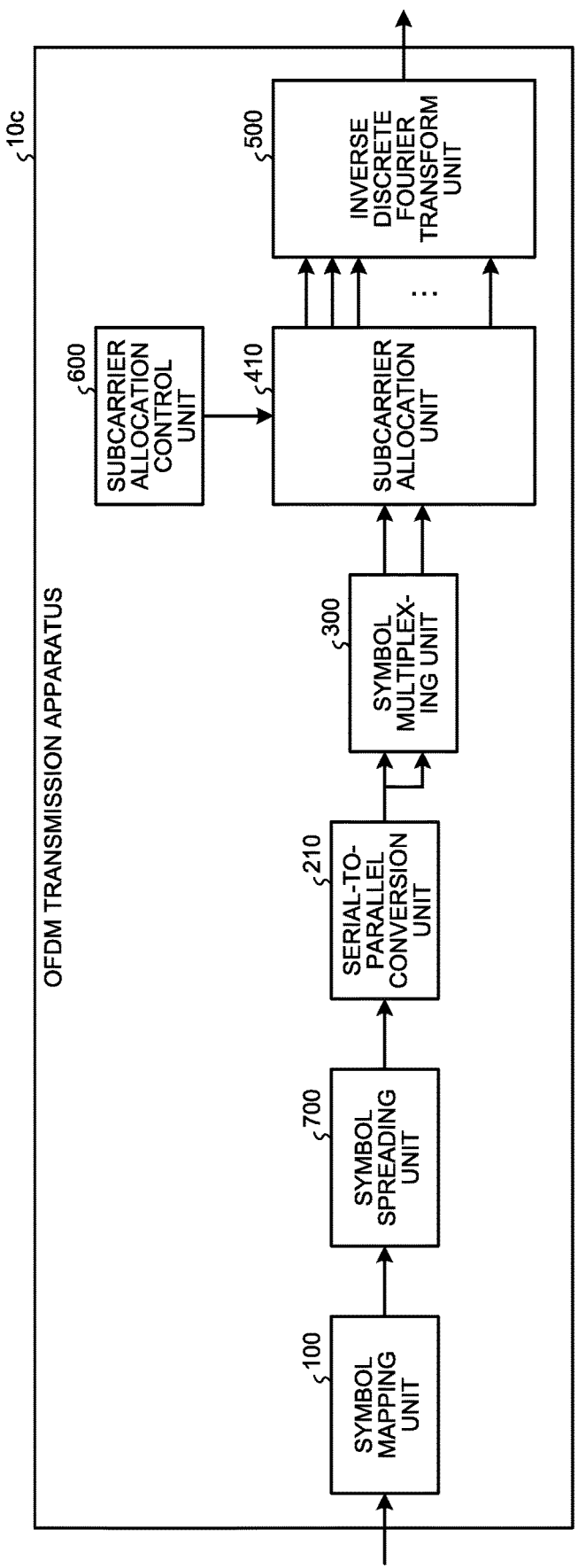
FIG. 15 is a block diagram illustrating an example configuration of an OFDM transmission apparatus according to a third embodiment.

FIG. 15 is a block diagram illustrating an example configuration of an OFDM transmission apparatus 10c according to the third embodiment. As compared with the OFDM transmission apparatus 10b, the OFDM transmission apparatus 10c is configured such that the serial-to-parallel conversion unit 200 is removed and a serial-to-parallel conversion unit 210 and a symbol spreading unit 700 are added. The symbol spreading unit 700 is disposed between the symbol mapping unit 100 and the serial-to-parallel conversion unit 210. The OFDM transmission apparatus 10c is a transmission apparatus that performs transmission using one frequency band in an OFDM scheme, i.e., using one OFDM symbol.

The symbol spreading unit 700 performs a spreading operation on a modulated symbol generated by primary modulation to generate a post-spread symbol, which is generated by spreading of the modulated symbol. Specifically, the symbol spreading unit 700 spreads a modulated symbol input from the symbol mapping unit 100 using an arbitrary spreading code dependent on the required transmission quality level of that modulated symbol to generate a post-spread symbol, and outputs the post-spread symbol to the serial-to-parallel conversion unit 210. If $SF_i$ denotes the spreading factor of the spreading code used for a modulated symbol $z_i$, then the symbol spreading unit 700 generates $SF_i$ post-spread symbols from the modulated symbol $z_i$.

Figure 16:
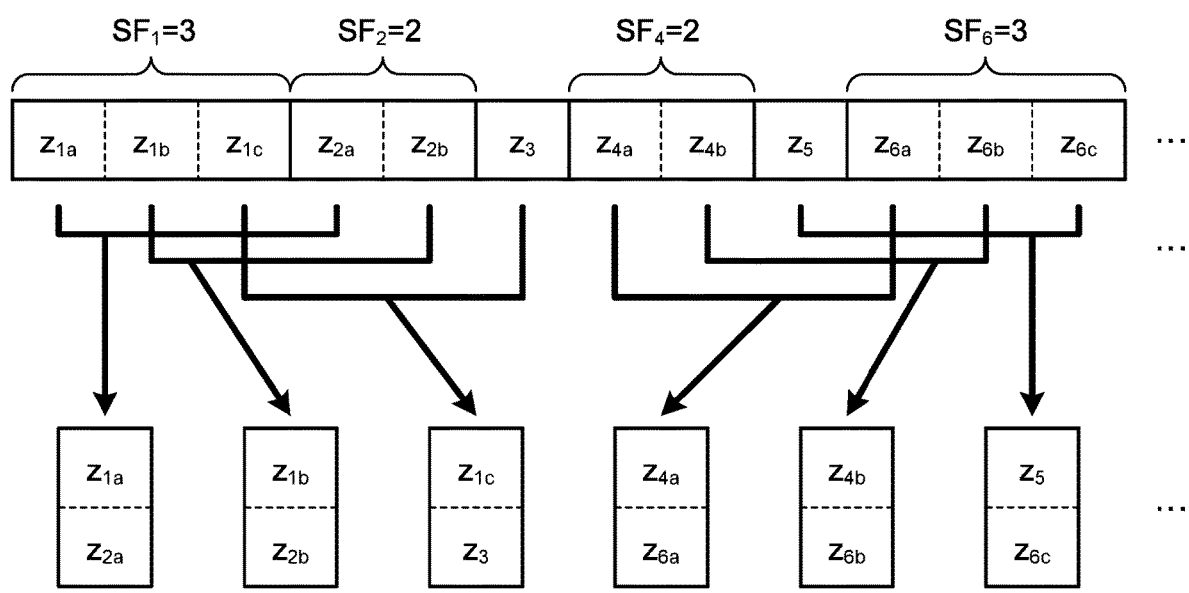
FIG. 16 is a diagram illustrating an example of post-spread symbols generated in a symbol spreading unit, and combinations of one or more post-spread symbols or one or more modulated symbols converted into a parallel format and output by a serial-to-parallel conversion unit, in the OFDM transmission apparatus according to the third embodiment.

FIG. 16 is a diagram illustrating an example of post-spread symbols generated in the symbol spreading unit 700, and combinations of one or more post-spread symbols or one or more modulated symbols converted into a parallel format and output by the serial-to-parallel conversion unit 210, in the OFDM transmission apparatus 10c according to the third embodiment. As an example as illustrated in FIG. 16, the symbol spreading unit 700 spreads the modulated symbols $z_1$ and $z_6$ each having a high required transmission quality level using a spreading code having a spreading factor of 3 to generate post-spread symbols $z_{1a}$, $z_{1b}$, and $z_{1c}$ and post-spread symbols $z_{6a}$, $z_{6b}$, and $z_{6c}$. In addition, the symbol spreading unit 700 spreads the modulated symbols $z_2$ and $z_4$ each having a medium required transmission quality level using a spreading code having a spreading factor of 2 to generate post-spread symbols $z_{2a}$ and $z_{2b}$ and post-spread symbols $z_{4a}$ and $z_{4b}$. The symbol spreading unit 700 performs no spreading operation on the modulated symbols $z_3$ and $z_5$ each having a low required transmission quality level, that is, requiring high-capacity transmission.

The serial-to-parallel conversion unit 210 converts, into a parallel format, L symbols generated from different modulated symbols before spreading, of the post-spread symbols input from the symbol spreading unit 700, and outputs these L symbols to the symbol multiplexing unit 300. For simplicity of illustration, the case of L=2 will be described here. As an example as illustrated in FIG. 16, the serial-to-parallel conversion unit 210 converts the post-spread symbols $z_{1a}$ and $z_{2a}$ into a parallel format, and outputs the post-spread symbols $z_{1a}$ and $z_{2a}$ simultaneously to the symbol multiplexing unit 300. Similarly, the serial-to-parallel conversion unit 210 converts the post-spread symbols $z_{1b}$ and $z_{2b}$ into a parallel format and outputs the post-spread symbols $z_{1b}$ and $z_{2b}$ simultaneously to the symbol multiplexing unit 300; converts the post-spread symbol $z_{1c}$ and the modulated symbol $z_3$ into a parallel format and outputs the post-spread symbol $z_{1c}$ and the modulated symbol $z_3$ simultaneously to the symbol multiplexing unit 300; converts the post-spread symbols $z_{6a}$ and $z_{4a}$ into a parallel format and outputs the post-spread symbols $z_{6a}$ and $z_{4a}$ simultaneously to the symbol multiplexing unit 300; converts the post-spread symbols $z_{6b}$ and $z_{4b}$ into a parallel format and outputs the post-spread symbols $z_{6b}$ and $z_{4b}$ simultaneously to the symbol multiplexing unit 300; and converts the post-spread symbol $z_{6c}$ and the modulated symbol $z_5$ into a parallel format and outputs the post-spread symbol $z_{6c}$ and the modulated symbol $z_5$ simultaneously to the symbol multiplexing unit 300.

The symbol multiplexing unit 300 generates a multiplexed symbol group using post-spread symbols or a combination of one or more modulated symbols and one or more post-spread symbols.

Figure 17:
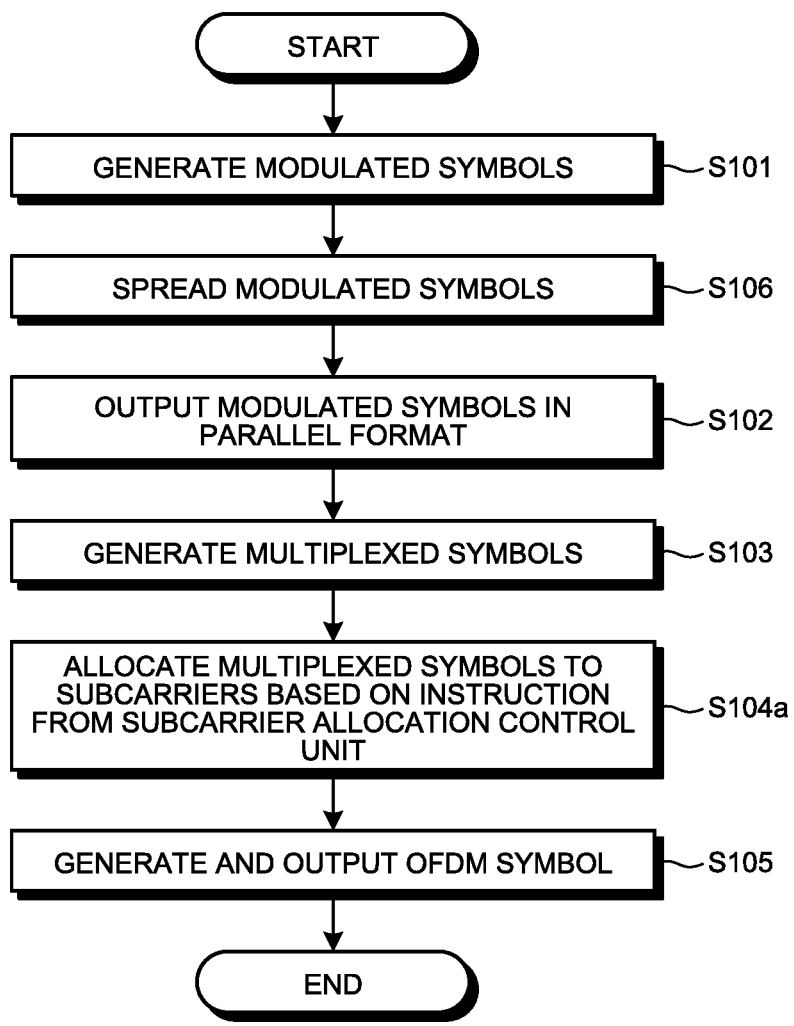
FIG. 17 is a flowchart illustrating OFDM symbol transmission processing performed by the OFDM transmission apparatus according to the third embodiment.

FIG. 17 is a flowchart illustrating OFDM symbol transmission processing performed by the OFDM transmission apparatus 10c according to the third embodiment. In the OFDM transmission apparatus 10c, after step S101, the symbol spreading unit 700 spreads a modulated symbol generated (step S106). The processing other than step S106 is similar to that performed by the OFDM transmission apparatus 10b as illustrated in FIG. 12.

As described above, according to the present embodiment, the OFDM transmission apparatus 10c performs a spreading operation on a modulated symbol having a high required transmission quality level, and performs no spreading operation on a modulated symbol having a low required transmission quality level but requiring high-capacity transmission. This operation enables the OFDM transmission apparatus 10c to achieve both improvement in transmission quality and reliable provision of required transmission rate.

The features of the third embodiment can be applied not only to the second embodiment, but also to other configurations, including the first embodiment.

The OFDM transmission apparatus 10c may be configured using hardware elements similar to the hardware elements of the OFDM transmission apparatus 10a described above.

Fourth Embodiment

In the first embodiment, one OFDM symbol is generated at one time, that is, OFDM transmission is performed using one frequency band. A fourth embodiment will be described below for a case in which L OFDM symbols are generated at one time, and OFDM transmission is performed using L frequency bands. In the description below, a frequency band for transmitting one OFDM symbol is referred to as "OFDM carrier" to distinguish from subcarriers, which are carriers within an OFDM symbol. That is, in the fourth embodiment, OFDM transmission is performed using L OFDM carriers having respective different frequencies.

Differences from the first embodiment will be described below.

Figure 18:
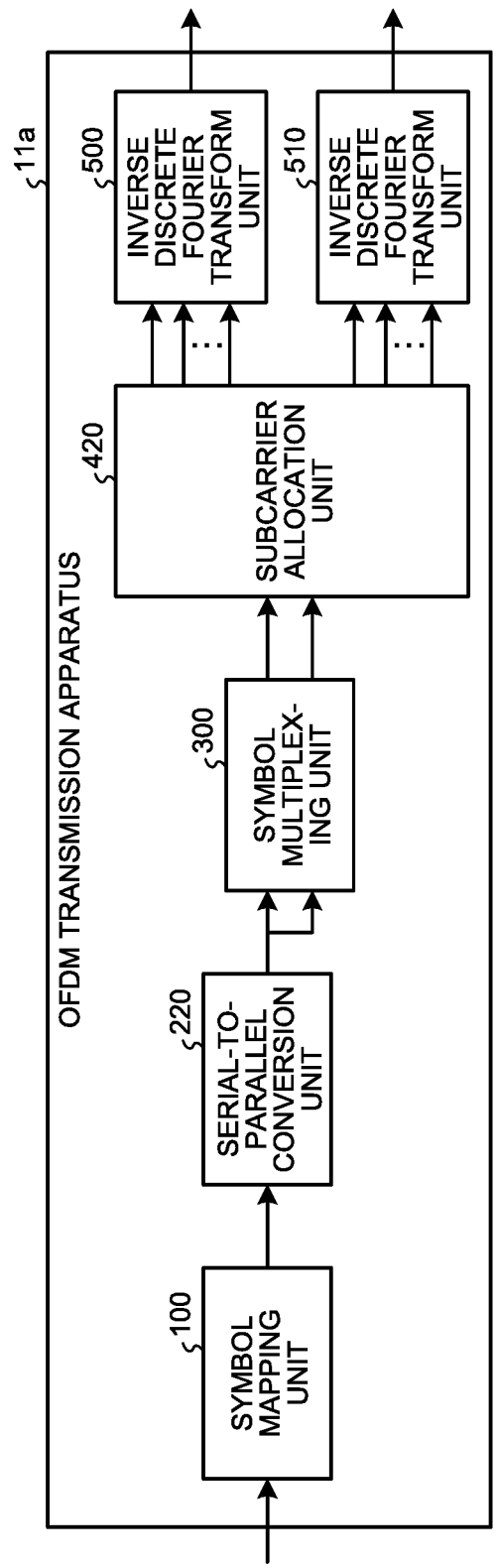
FIG. 18 is a block diagram illustrating an example configuration of an OFDM transmission apparatus according to a fourth embodiment.

FIG. 18 is a block diagram illustrating an example configuration of an OFDM transmission apparatus 11a according to the fourth embodiment. For simplicity of illustration, the case of L=2 will be described here. As compared with the OFDM transmission apparatus 10a, OFDM transmission apparatus 11a is configured such that the serial-to-parallel conversion unit 200 and the subcarrier allocation unit 400 are removed and that a serial-to-parallel conversion unit 220, a subcarrier allocation unit 420, and an inverse discrete Fourier transform unit 510 are added. The inverse discrete Fourier transform unit 510 operates similarly to the inverse discrete Fourier transform unit 500. Note that L may represent 3 or more, in which case the OFDM transmission apparatus 11a can be configured to include L inverse discrete Fourier transform units that each operate similarly to the inverse discrete Fourier transform unit 500. For example, in the case of L=4, the OFDM transmission apparatus 11a will include inverse discrete Fourier transform units 500, 510, 520, and 530. The inverse discrete Fourier transform units 520 and 530 each operate similarly to the inverse discrete Fourier transform unit 500. The OFDM transmission apparatus 11a is a transmission apparatus that performs transmission using multiple frequency bands in an OFDM scheme, i.e., using multiple OFDM symbols.

The serial-to-parallel conversion unit 220 outputs M×L modulated symbols, which are modulated symbols corresponding to L OFDM carriers, input from the symbol mapping unit 100 to the symbol multiplexing unit 300 such that L modulated symbols are output in parallel each time. For serial-to-parallel conversion, the serial-to-parallel conversion unit 220 may sequentially output the input modulated symbols in time sequence such that L modulated symbols are output each time, or it may include a memory to store M×L modulated symbols, convert L temporally-separated modulated symbols into a parallel format, and output the L modulated symbols in parallel.

The subcarrier allocation unit 420 allocates the multiplexed symbol group, i.e., the L multiplexed symbols input in parallel, from the symbol multiplexing unit 300 to subcarriers of the OFDM symbols on the OFDM carriers in respective different frequency bands. After completion of allocation of the multiplexed symbols for the L OFDM symbols, i.e., M×L multiplexed symbols, to the respective subcarriers, the subcarrier allocation unit 420 outputs the M×L multiplexed symbols to the L inverse discrete Fourier transform units 500 and 510 such that M multiplexed symbols are output in parallel.

Figure 19:
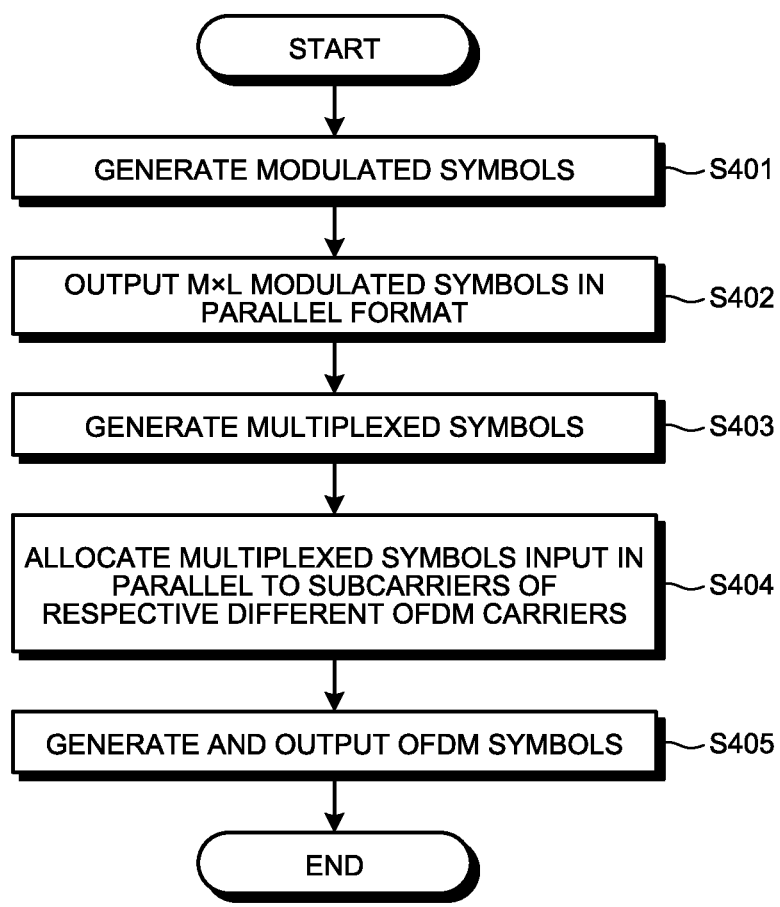
FIG. 19 is a flowchart illustrating OFDM symbol transmission processing performed by the OFDM transmission apparatus according to the fourth embodiment.

An operation of the OFDM transmission apparatus 11a of generating an OFDM symbol from a bit series and of sending the OFDM symbol will next be described. FIG. 19 is a flowchart illustrating OFDM symbol transmission processing performed by the OFDM transmission apparatus 11a according to the fourth embodiment. In the OFDM transmission apparatus 11a, firstly, the symbol mapping unit 100 performs primary modulation on a bit series to generate modulated symbols (step S401). The serial-to-parallel conversion unit 220 converts the M×L modulated symbols into a parallel format, and outputs the modulated symbols such that L modulated symbols are output in parallel each time in this example (step S402). The symbol multiplexing unit 300 multiplies an L-element column vector containing L modulated symbols input in parallel by an L×L precoding matrix to generate L multiplexed symbols (step S403). The subcarrier allocation unit 420 allocates the M×L multiplexed symbols such that the L multiplexed symbols input in parallel are allocated to subcarriers of respective different OFDM carriers (step S404). The inverse discrete Fourier transform units 500 and 510 each perform inverse discrete Fourier transform on the M multiplexed symbols to generate an OFDM symbol, and each output the OFDM symbol (step S405).

Figure 20:
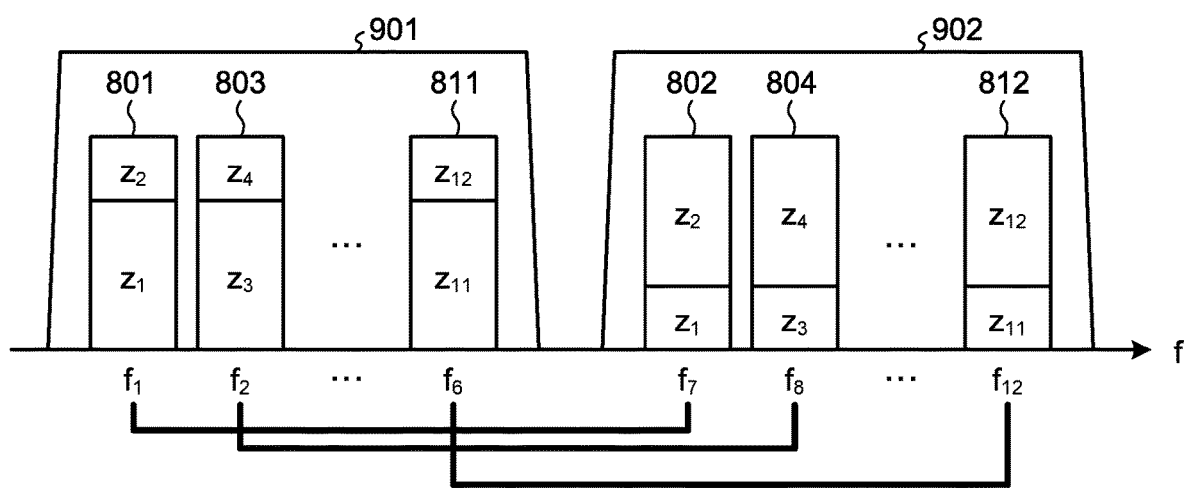
FIG. 20 is a diagram illustrating an example of allocation of multiplexed symbols to subcarriers performed in the subcarrier allocation unit according to the fourth embodiment.

An operation of the subcarrier allocation unit 420 will next be described in detail. FIG. 20 is a diagram illustrating an example of allocation of multiplexed symbols to subcarriers performed in the subcarrier allocation unit 420 according to the fourth embodiment. As an example, a description will be given below assuming that the number of subcarriers M per OFDM carrier is six. The subcarrier allocation unit 420 allocates the two multiplexed symbols 801 and 802 input in parallel from the symbol multiplexing unit 300 respectively to the subcarriers $f_1$ and $f_7$ having the lowest frequency in two OFDM carriers 901 and 902.

Similarly, the subcarrier allocation unit 420 allocates the multiplexed symbols 803 and 804 input in parallel respectively to the subcarriers $f_2$ and $f_6$ respectively in the OFDM carriers 901 and 902; allocates the multiplexed symbols 805 and 806 input in parallel respectively to the subcarriers $f_3$ and $f_9$ respectively in the OFDM carriers 901 and 902;

allocates the multiplexed symbols 807 and 808 input in parallel respectively to the subcarriers $f_4$ and $f_{10}$ respectively in the OFDM carriers 901 and 902; allocates the multiplexed symbols 809 and 810 input in parallel respectively to the subcarriers $f_5$ and $f_{11}$ respectively in the OFDM carriers 901 and 902; and allocates the multiplexed symbols 811 and 812 input in parallel respectively to the subcarriers $f_6$ and $f_{12}$ respectively in the OFDM carriers 901 and 902.

The example of FIG. 20 assumes that the subcarrier allocation unit 420 allocates the multiplexed symbols input in parallel from the symbol multiplexing unit 300 to subcarriers in time sequence in ascending order of the subcarrier frequency in each OFDM carrier. However, the allocation operation is not limited thereto. The subcarrier allocation unit 420 may allocate the multiple multiplexed symbols input in parallel from the symbol multiplexing unit 300 to arbitrary subcarriers of respective different OFDM carriers.

As described above, according to the present embodiment, the OFDM transmission apparatus 11a allocates, to subcarriers of respective different OFDM carriers, the multiplexed symbols contained in one multiplexed symbol group generated from one modulated symbol group, and transmits the multiplexed symbols. This enables the OFDM transmission apparatus 11a to allocate the multiple multiplexed symbols generated from one modulated symbol group to subcarriers having a smaller frequency correlation therebetween than the frequency correlations existing in the first embodiment. Thus, the OFDM transmission apparatus 11a can apply an error correction code that provides a higher code rate than that of the first embodiment, and can thereby further improve the transmission efficiency without a reduction in frequency-selective fading resistance.

The OFDM transmission apparatus 11a may be configured using hardware elements similar to the hardware elements of the OFDM transmission apparatus 10a described above.

Fifth Embodiment

In the fourth embodiment, the subcarrier allocation unit 420 of the OFDM transmission apparatus 11a applies the same subcarrier allocation pattern to a set of the multiplexed symbols for each OFDM symbol. In a fifth embodiment, the subcarrier allocation pattern of the multiplexed symbols is changed for each OFDM symbol. Differences from the second and fourth embodiments will be described below.

Figure 21:
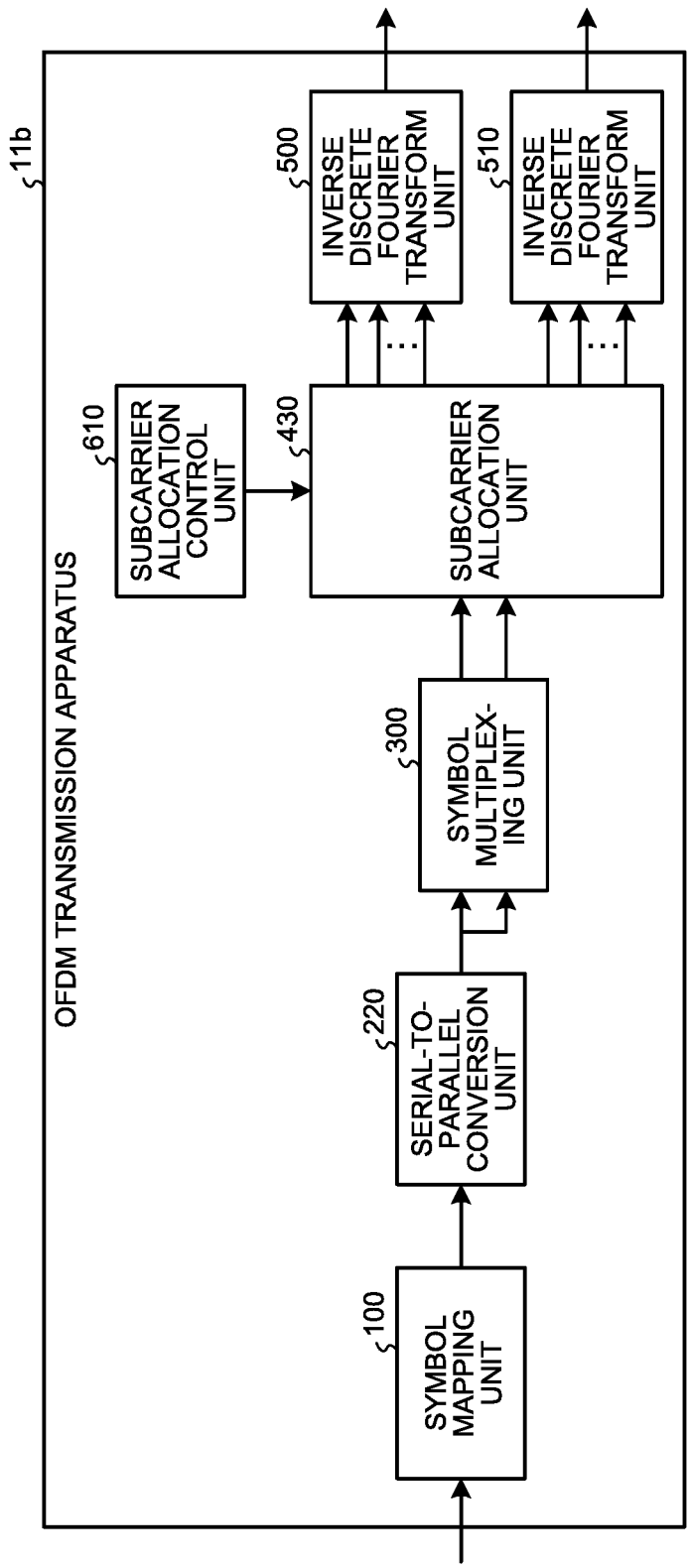
FIG. 21 is a block diagram illustrating an example configuration of an OFDM transmission apparatus according to a fifth embodiment.

FIG. 21 is a block diagram illustrating an example configuration of an OFDM transmission apparatus 11b according to the fifth embodiment. For simplicity of illustration, the case of L=2 will be described here. As compared with the OFDM transmission apparatus 11a, the OFDM transmission apparatus 11b is configured such that the subcarrier allocation unit 420 is removed and a subcarrier allocation unit 430 and a subcarrier allocation control unit 610 are added. The OFDM transmission apparatus 11b is a transmission apparatus that performs transmission using multiple frequency bands in an OFDM scheme, i.e., using multiple OFDM symbols.

The subcarrier allocation unit 430 changes the OFDM carrier and the subcarrier to which a particular multiplexed symbol is to be allocated on the basis of an instruction from the subcarrier allocation control unit 610.

The subcarrier allocation control unit 610 indicates, to the subcarrier allocation unit 430, the OFDM carrier and the subcarrier number of the subcarrier to which a particular multiplexed symbol is to be allocated. In addition, the subcarrier allocation control unit 610 may control the subcarrier allocation unit 430 to change the subcarrier allocation pattern of a multiplexed symbol pair depending on the transmission timing. For simplicity of illustration, the case of L=2 and M=6 will be described here. As an example, a case will be described below in terms of a first OFDM carrier group transmitted at time $t_1$ and a second OFDM carrier group transmitted at time $t_2$.

Figure 22:
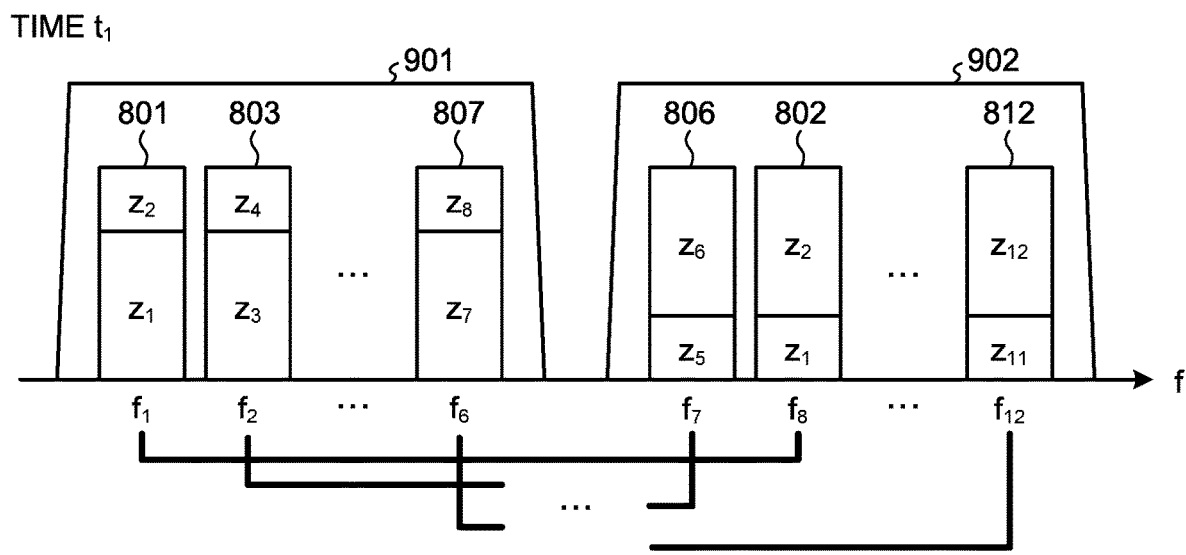
FIG. 22 is a diagram illustrating an example of allocation of multiplexed symbols to subcarriers performed at time $t_1$ by the OFDM transmission apparatus according to the fifth embodiment.
Figure 23:
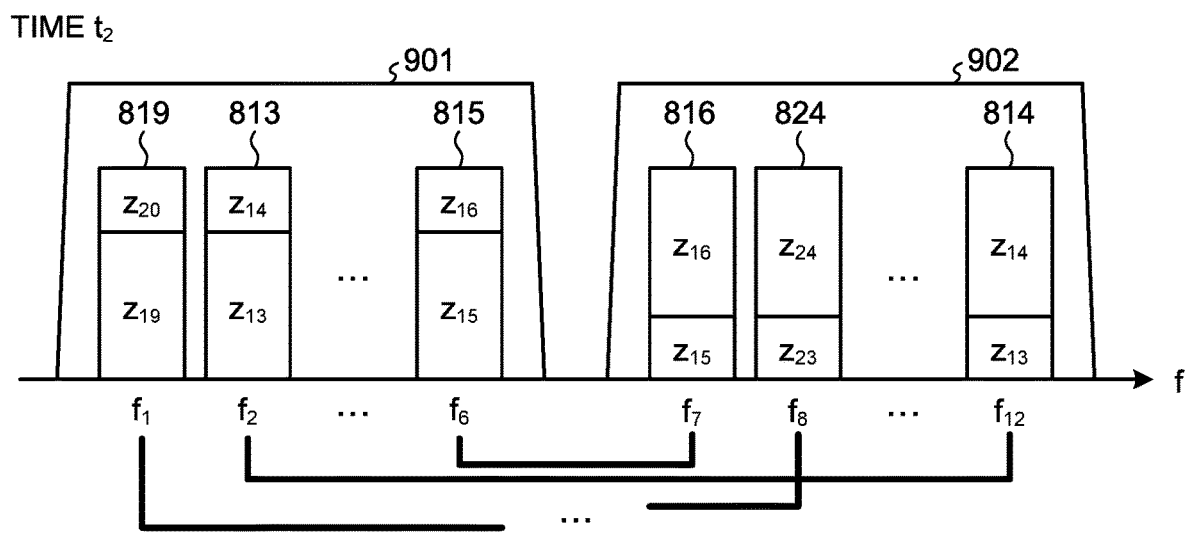
FIG. 23 is a diagram illustrating an example of allocation of multiplexed symbols to subcarriers performed at time $t_2$ by the OFDM transmission apparatus according to the fifth embodiment.

FIG. 22 is a diagram illustrating an example of allocation of multiplexed symbols to subcarriers performed at time $t_1$ by the OFDM transmission apparatus 11b according to the fifth embodiment. FIG. 23 is a diagram illustrating an example of allocation of multiplexed symbols to subcarriers performed at time $t_2$ by the OFDM transmission apparatus 11b according to the fifth embodiment. For the first OFDM carrier group, the subcarrier allocation control unit 610 controls the subcarrier allocation unit 430 such that, as illustrated in FIG. 22, the multiplexed symbols 801 and 802 each containing the modulated symbols $z_1$ and $z_2$ are respectively allocated to the subcarrier $f_1$ of the OFDM carrier 901 and to the subcarrier $f_8$ of the OFDM carrier 902. For the second OFDM carrier group, the subcarrier allocation control unit 610 controls the subcarrier allocation unit 430 such that, as illustrated in FIG. 23, the multiplexed symbols 813 and 814 each containing the modulated symbols $z_{13}$ and $z_{14}$ are respectively allocated to the subcarrier $f_2$ of the OFDM carrier 901 and to the subcarrier $f_{12}$ of the OFDM carrier 902.

In FIGS. 22 and 23, the modulated symbols $z_1$ and $z_{13}$ may be different data or the same data. In a case in which the modulated symbols $z_1$ and $z_{13}$ are the same data, the OFDM transmission apparatus 11b applies different subcarrier allocation patterns to the first OFDM carrier group and the second OFDM carrier group to consecutively transmit the same data. Note that the example of subcarrier allocation pattern of multiplexed symbols at each time point is not limited to the examples of FIGS. 22 and 23.

In addition, in a case of performing consecutive transmission of the same data over multiple OFDM carrier groups, the subcarrier allocation control unit 610 may change the OFDM carriers to which a particular multiplexed symbol pair is allocated. As an example, a case will be described below in terms of the first OFDM carrier group transmitted at time $t_1$ and the second OFDM carrier group transmitted at time $t_2$.

Figure 24:
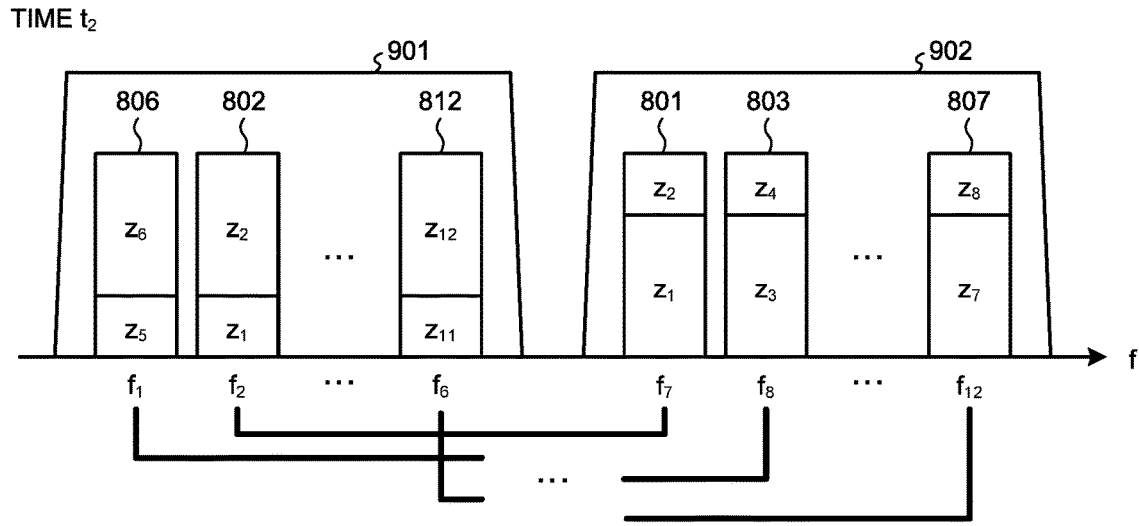
FIG. 24 is a diagram illustrating another example of allocation of multiplexed symbols to subcarriers performed at time $t_2$ by the OFDM transmission apparatus according to the fifth embodiment.

FIG. 24 is a diagram illustrating another example of allocation of multiplexed symbols to subcarriers performed at time $t_2$ by the OFDM transmission apparatus 11b according to the fifth embodiment. For the first OFDM carrier group, the subcarrier allocation control unit 610 controls the subcarrier allocation unit 430 such that, as illustrated in FIG. 22, the multiplexed symbols 801 and 802 each containing the modulated symbols $z_1$ and $z_2$ are respectively allocated to the subcarrier $f_1$ of the OFDM carrier 901 and to the subcarrier $f_8$ of the OFDM carrier 902. For the second OFDM carrier group, the subcarrier allocation control unit 610 controls the subcarrier allocation unit 430 such that, as illustrated in FIG. 24, the multiplexed symbols 801 and 802 are respectively allocated to subcarrier $f_7$ of the OFDM carrier 902 and to the subcarrier $f_2$ of the OFDM carrier 901.

Note that the example of allocation pattern of multiplexed symbols to the OFDM carriers and to the subcarriers at each time point is not limited to the examples of FIGS. 22 and 24.

If the time variation of the propagation channel is small, the subcarrier allocation control unit 610 may change the allocation pattern of multiplexed symbols to the OFDM carriers and to the subcarrier at a time interval less than the time variation of the propagation channel. Propagation channel information may be obtained similarly to the second embodiment described above.

Figure 25:
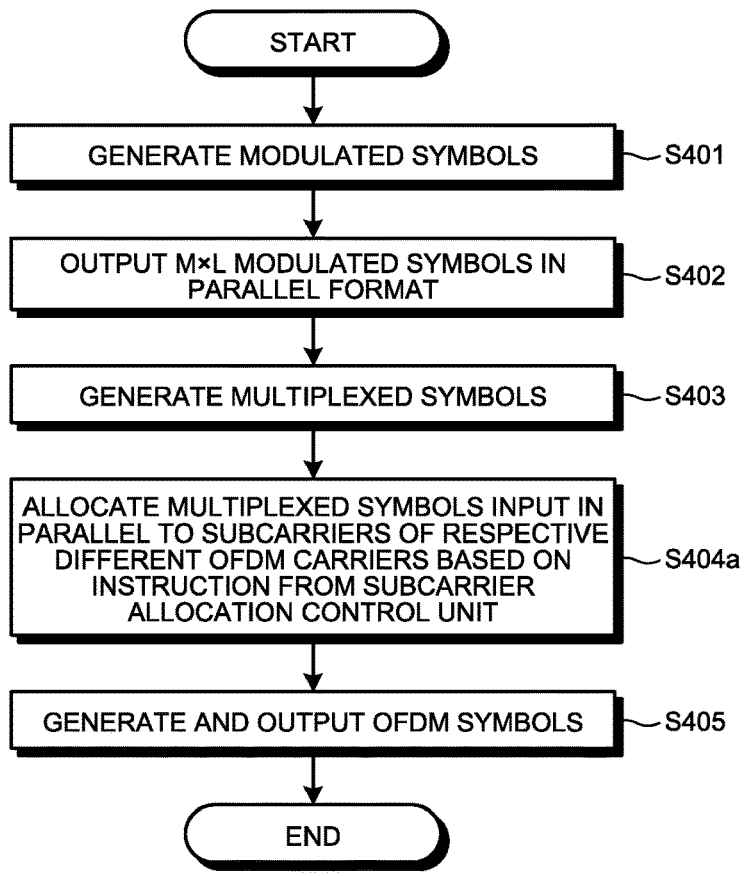
FIG. 25 is a flowchart illustrating OFDM symbol transmission processing performed by the OFDM transmission apparatus according to the fifth embodiment.

FIG. 25 is a flowchart illustrating OFDM symbol transmission processing performed by the OFDM transmission apparatus 11b according to the fifth embodiment. The processing at steps S401 to S403 and step at S405 is similar to that performed by the OFDM transmission apparatus 11a as illustrated in FIG. 19. In the OFDM transmission apparatus 11b, the subcarrier allocation unit 430 allocates L multiplexed symbols input in parallel to subcarriers of respective different OFDM carriers on the basis of an instruction from the subcarrier allocation control unit 610 (step S404a).

As described above, according to the present embodiment, the OFDM transmission apparatus 11b changes the subcarrier allocation pattern of the multiplexed symbols at every OFDM symbol transmission time. This operation enables the OFDM transmission apparatus 11b to randomize the transmission error pattern so as to improve the effect of error correction even when the time variation of the propagation channel is small and the reception electric field intensity of the same subcarrier decreases for a long time due to an effect of frequency-selective fading.

Moreover, in a case in which a data sequence is consecutively transmitted over OFDM carrier groups at multiple time points, the operation above enables the OFDM transmission apparatus 11b to reduce the probability that multiplexed symbols each containing the same set of modulated symbols temporally continuously suffer from a transmission error, thereby enabling the effect of error correction to be improved.

The OFDM transmission apparatus 11b may be configured using hardware elements similar to the hardware elements of the OFDM transmission apparatus 10a described above.

Sixth Embodiment

In a sixth embodiment, a modulated symbol is spread using a spreading code depending on the required transmission quality level of that modulated symbol. Differences from the third and fifth embodiments will be described below.

Figure 26:
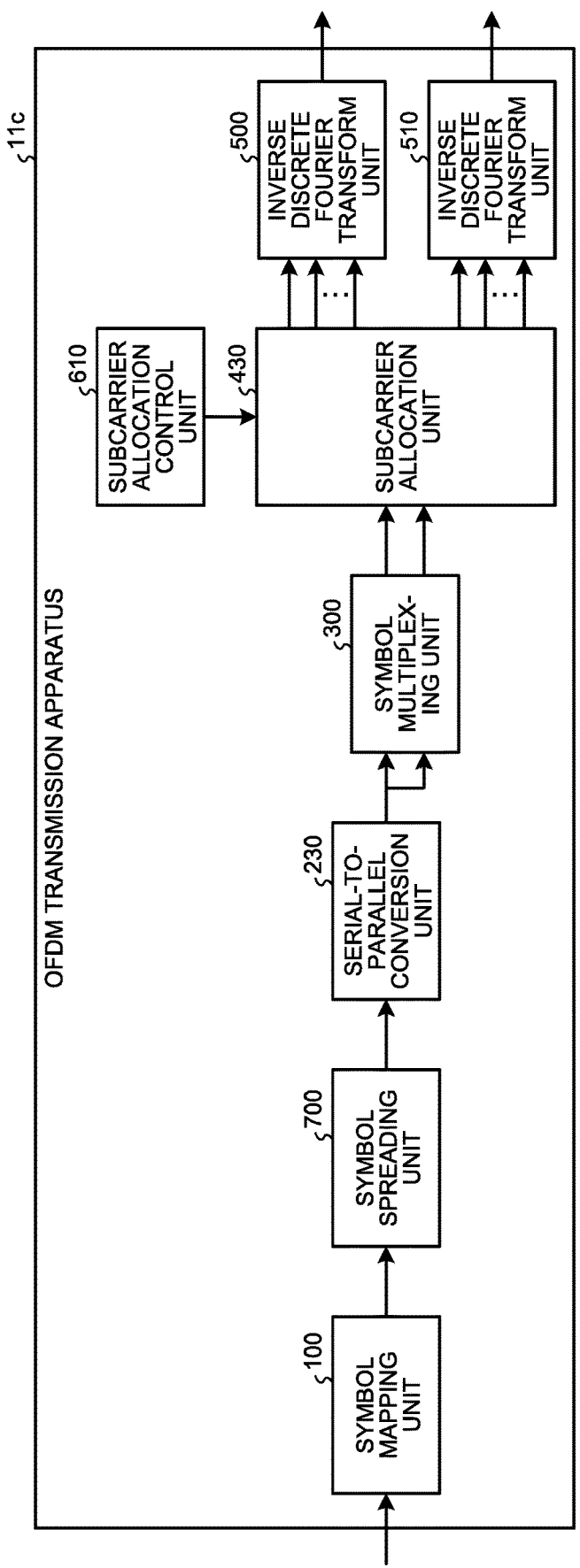
FIG. 26 is a block diagram illustrating an example configuration of an OFDM transmission apparatus according to a sixth embodiment.

FIG. 26 is a block diagram illustrating an example configuration of an OFDM transmission apparatus 11c according to the sixth embodiment. As compared with the OFDM transmission apparatus 11b, the OFDM transmission apparatus 11c is configured such that the serial-to-parallel conversion unit 220 is removed and a serial-to-parallel conversion unit 230 and the symbol spreading unit 700 are added. The OFDM transmission apparatus 11c is a transmission apparatus that performs transmission using multiple frequency bands in an OFDM scheme, i.e., using multiple OFDM symbols.

The serial-to-parallel conversion unit 230 converts, into a parallel format, L symbols generated from different modulated symbols before spreading, of the post-spread symbols input from the symbol spreading unit 700, and outputs M×L modulated symbols, which are modulated symbols corresponding to L OFDM carriers, to the symbol multiplexing unit 300 such that L modulated symbols are output in parallel each time.

Figure 27:
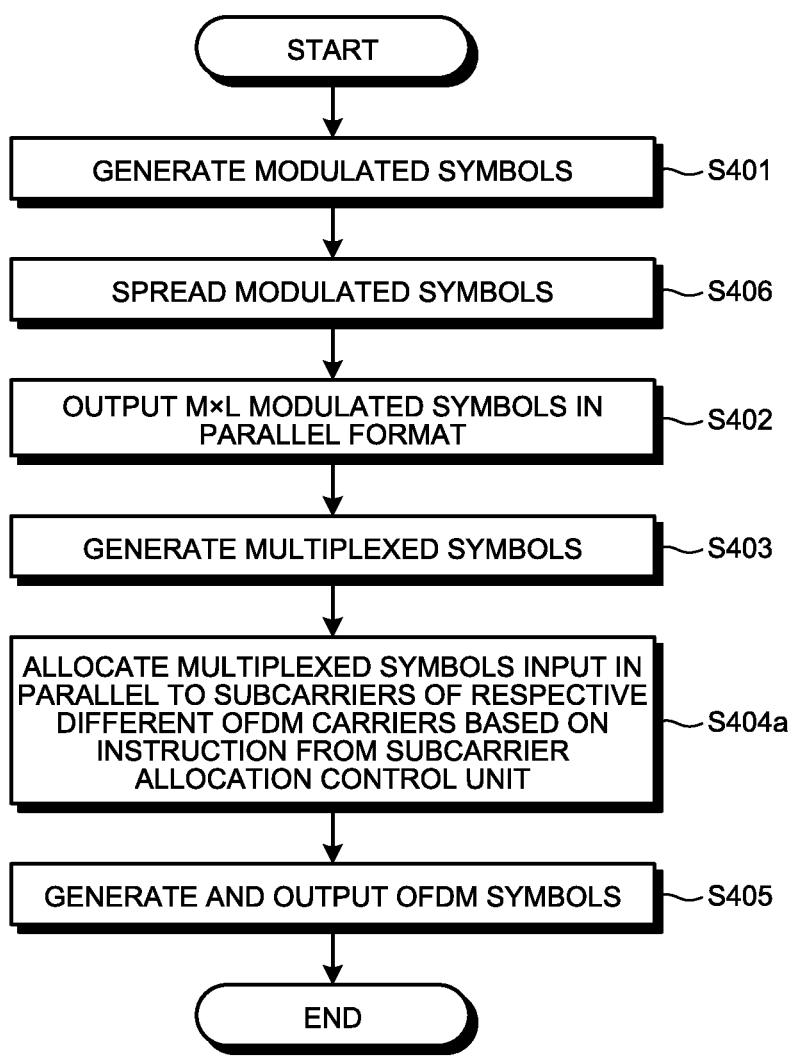
FIG. 27 is a flowchart illustrating OFDM symbol transmission processing performed by the OFDM transmission apparatus according to the sixth embodiment.

FIG. 27 is a flowchart illustrating OFDM symbol transmission processing performed by the OFDM transmission apparatus 11c according to the sixth embodiment. In the OFDM transmission apparatus 11c, after step S401, the symbol spreading unit 700 spreads a modulated symbol generated (step S406). The processing other than step S406 is similar to that performed by the OFDM transmission apparatus 11b as illustrated in FIG. 25.

As described above, according to the present embodiment, the OFDM transmission apparatus 11c performs a spreading operation on a modulated symbol having a high required transmission quality level, and performs no spreading operation on a modulated symbol having a low required transmission quality level but requiring high-capacity transmission. This operation enables the OFDM transmission apparatus 11c to achieve both improvement in transmission quality and reliable provision of required transmission rate.

The features of the sixth embodiment can be applied not only to the fifth embodiment, but also to other configurations, including the fourth embodiment.

The OFDM transmission apparatus 11c may be configured using hardware elements similar to the hardware elements of the OFDM transmission apparatus 10a described above.

Seventh Embodiment.

In the fourth embodiment, the number of multiplexed symbols in one multiplexed symbol group and the number of OFDM carriers are all the same. A seventh embodiment will be described below for a case in which the number of multiplexed symbols in one multiplexed symbol group is less than the number of OFDM carriers N. Differences from the first and fourth embodiments will be described below.

Figure 28:
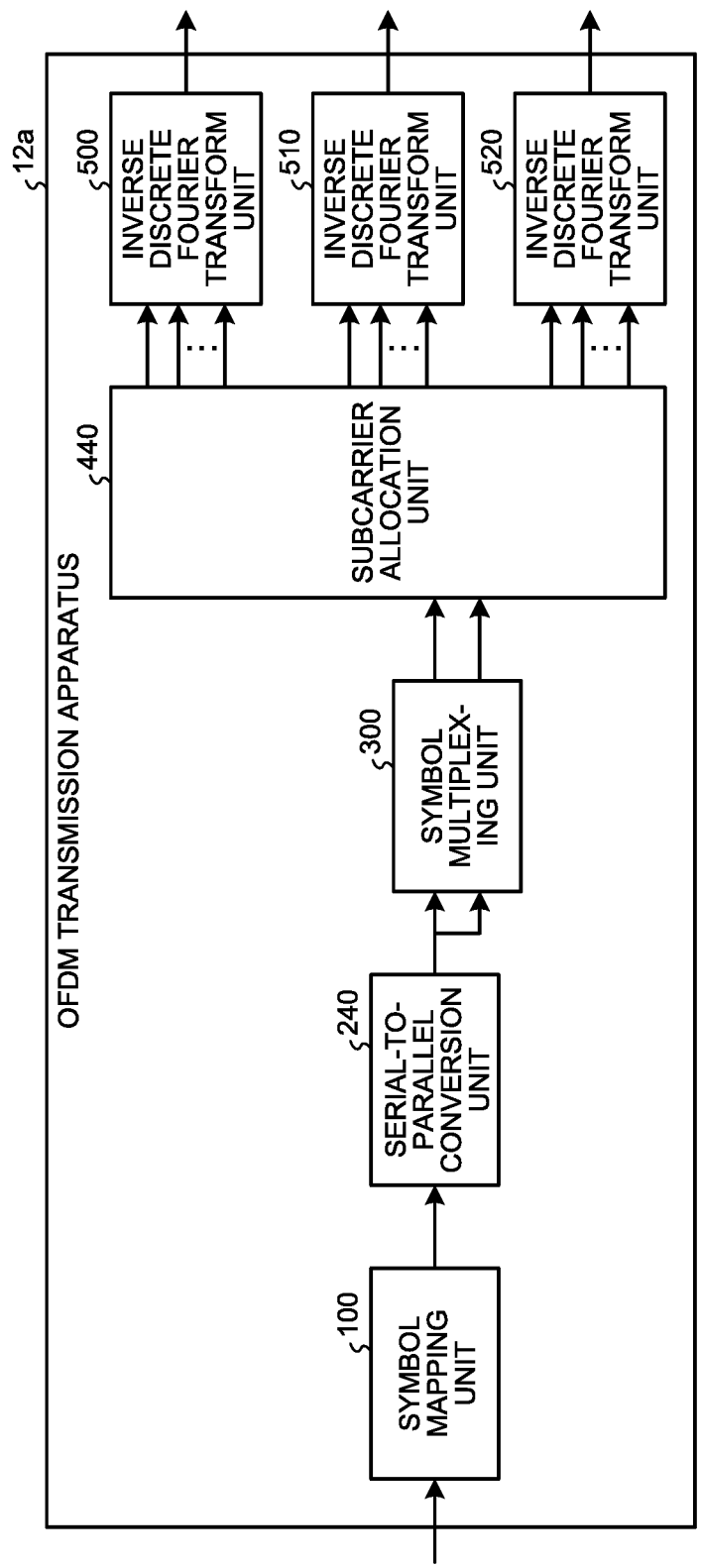
FIG. 28 is a block diagram illustrating an example configuration of an OFDM transmission apparatus according to a seventh embodiment.

FIG. 28 is a block diagram illustrating an example configuration of an OFDM transmission apparatus 12a according to the seventh embodiment. For simplicity of illustration, the description below is given on an assumption that the number of OFDM carriers N is three. As compared with the OFDM transmission apparatus 11a, the OFDM transmission apparatus 12a is configured such that the serial-to-parallel conversion unit 220 and the subcarrier allocation unit 420 are removed and a serial-to-parallel conversion unit 240, a subcarrier allocation unit 440, and an inverse discrete Fourier transform unit 520 are added. The inverse discrete Fourier transform unit 520 operates similarly to the inverse discrete Fourier transform unit 500. The number of OFDM carriers N may be any number greater than L, in which case the OFDM transmission apparatus 12a can be configured to include N inverse discrete Fourier transform units that each operate similarly to the inverse discrete Fourier transform unit 500. For example, in the case of N=4, the OFDM transmission apparatus 12a will include inverse discrete Fourier transform units 500, 510, 520, and 530. The inverse discrete Fourier transform unit 530 operates similarly to the inverse discrete Fourier transform unit 500. The OFDM transmission apparatus 12a is a transmission apparatus that performs transmission using multiple frequency bands in an OFDM scheme, i.e., using multiple OFDM symbols.

The serial-to-parallel conversion unit 240 outputs M×N modulated symbols, which are modulated symbols corresponding to N OFDM carriers, input from the symbol mapping unit 100, to the symbol multiplexing unit 300 such that L modulated symbols are output in parallel each time. For serial-to-parallel conversion, the serial-to-parallel conversion unit 240 may sequentially output the input modulated symbols in time sequence such that L modulated symbols are output each time, or it may include a memory to store M×N modulated symbols, convert L temporally-separated modulated symbols into a parallel format, and output the L modulated symbols in parallel.

The subcarrier allocation unit 440 allocates L multiplexed symbols input in parallel from the symbol multiplexing unit 300 to subcarriers of respective different OFDM carriers. After completion of allocation of the multiplexed symbols for the N OFDM symbols, i.e., the M×N multiplexed symbols, to the respective subcarriers, the subcarrier allocation unit 440 outputs the M×N multiplexed symbols to the N inverse discrete Fourier transform units 500, 510, and 520 such that M multiplexed symbols are output in parallel.

Figure 29:
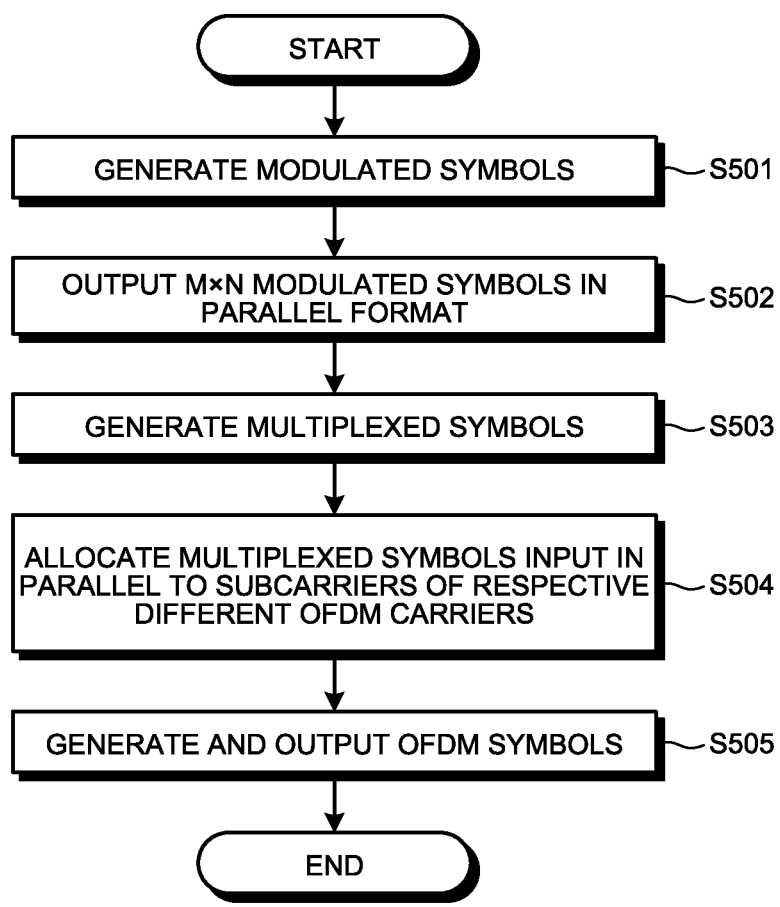
FIG. 29 is a flowchart illustrating OFDM symbol transmission processing performed by the OFDM transmission apparatus according to the seventh embodiment.

An operation of the OFDM transmission apparatus 12*a* of generating an OFDM symbol from a bit series and of sending the OFDM symbol will next be described. FIG. 29 is a flowchart illustrating OFDM symbol transmission processing performed by the OFDM transmission apparatus 12*a* according to the seventh embodiment. In the OFDM transmission apparatus 12*a*, firstly, the symbol mapping unit 100 performs primary modulation on a bit series to generate modulated symbols (step S501). The serial-to-parallel conversion unit 240 converts the M×N modulated symbols into a parallel format, and outputs the modulated symbols such that L modulated symbols are output in parallel each time in this example (step S502). The symbol multiplexing unit 300 multiplies an L-element column vector containing L modulated symbols input in parallel by an L×L precoding matrix to generate L multiplexed symbols (step S503). The subcarrier allocation unit 440 allocates the M×N multiplexed symbols such that the L multiplexed symbols input in parallel are allocated to subcarriers of respective different OFDM carriers (step S504). The inverse discrete Fourier transform units 500, 510, and 520 each perform inverse discrete Fourier transform on the M multiplexed symbols to generate an OFDM symbol, and each output the OFDM symbol (step S505).

Figure 30:
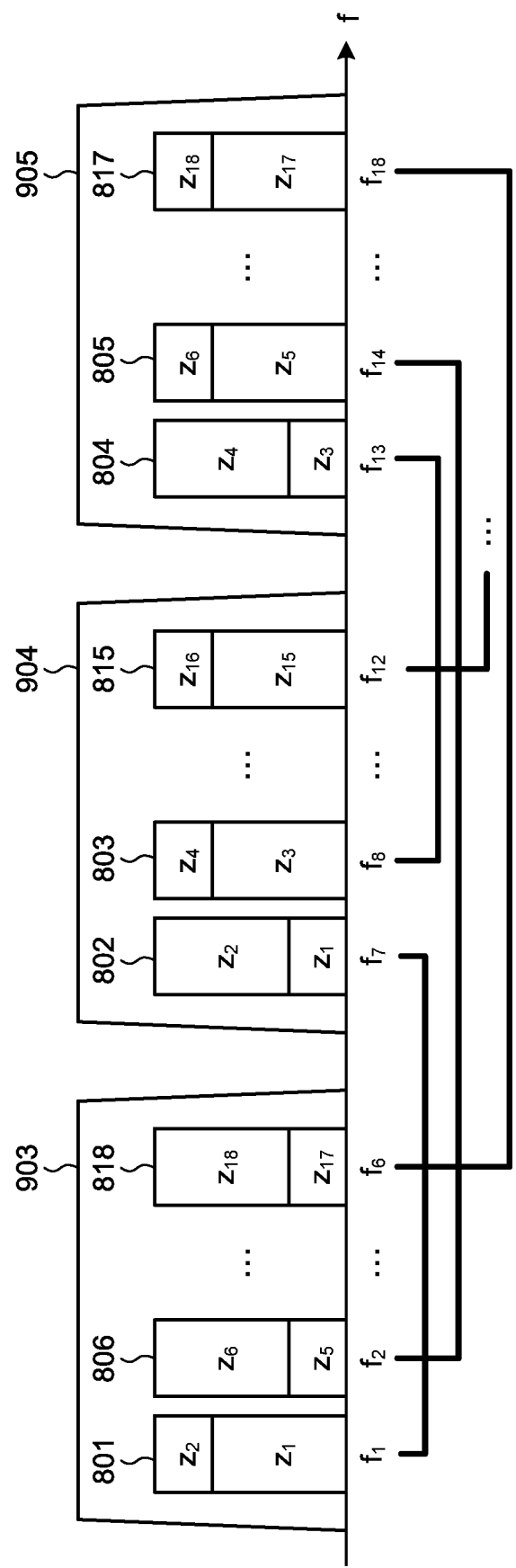
FIG. 30 is a diagram illustrating an example of allocation of multiplexed symbols to subcarriers performed in the subcarrier allocation unit according to the seventh embodiment.

An operation of the subcarrier allocation unit 440 will next be described in detail. FIG. 30 is a diagram illustrating an example of allocation of multiplexed symbols to subcarriers performed in the subcarrier allocation unit 440 according to the seventh embodiment. As an example, a description will be given below assuming that the number of subcarriers M per OFDM carrier is six. The subcarrier allocation unit 440 allocates the two multiplexed symbols 801 and 802 input in parallel from the symbol multiplexing unit 300 respectively to the subcarriers $f_1$ and $f_7$ having the lowest frequency in two OFDM carriers 903 and 904 of the three OFDM carriers 903, 904, and 905.

Similarly, the subcarrier allocation unit 440 allocates the multiplexed symbols 803 and 804 input in parallel respectively to the subcarrier $f_8$ of the OFDM carrier 904 and to the subcarrier $f_{13}$ of the OFDM carrier 905, and allocates the multiplexed symbols 805 and 806 input in parallel respectively to the subcarrier $f_{14}$ of the OFDM carrier 905 and to the subcarrier $f_2$ of the OFDM carrier 903. The subcarrier allocation unit 440 allocates the other multiplexed symbols 807 to 818 in a similar manner. That is, the subcarrier allocation unit 440 allocates two multiplexed symbols input in parallel to subcarriers of respective different OFDM carriers.

The example of FIG. 30 assumes that the subcarrier allocation unit 440 selects two different OFDM carriers in time sequence, and allocates the multiplexed symbols input in parallel from the symbol multiplexing unit 300 to subcarriers in ascending order of the subcarrier frequency in each of the selected OFDM carriers in time sequence. However, the allocation operation is not limited thereto. The subcarrier allocation unit 440 may allocate, to arbitrary subcarriers of respective different OFDM carriers, the multiple multiplexed symbols which are input in parallel from the symbol multiplexing unit 300 and each of which contains the same set of modulated symbols.

As described above, according to the present embodiment, the OFDM transmission apparatus 12*a* allocates, to subcarriers of respective different OFDM carriers, the multiplexed symbols contained in one multiplexed symbol group generated from one modulated symbol group, and transmits the multiplexed symbols. In a similar manner to the fourth embodiment, this enables the OFDM transmission apparatus 12*a* to allocate the multiple multiplexed symbols generated from one modulated symbol group to subcarriers having a smaller frequency correlation therebetween than the frequency correlations existing in the first embodiment. Thus, an advantage similar to that of the fourth embodiment can be provided. By using less multiplexed symbols in one multiplexed symbol group than the number of OFDM carriers, the OFDM transmission apparatus 12*a* allows a peer device that is a reception apparatus (not illustrated) to perform demodulation processing more simply than in the case of the fourth embodiment.

The OFDM transmission apparatus 12*a* may be configured using hardware elements similar to the hardware elements of the OFDM transmission apparatus 10*a* described above.

Eighth Embodiment

In the seventh embodiment, the subcarrier allocation unit 440 of the OFDM transmission apparatus 12*a* applies the same subcarrier allocation pattern to a set of the multiplexed symbols for each OFDM symbol. In an eighth embodiment, the subcarrier allocation pattern of the multiplexed symbols is changed for each OFDM symbol. Differences from the fifth and seventh embodiments will be described below.

Figure 31:
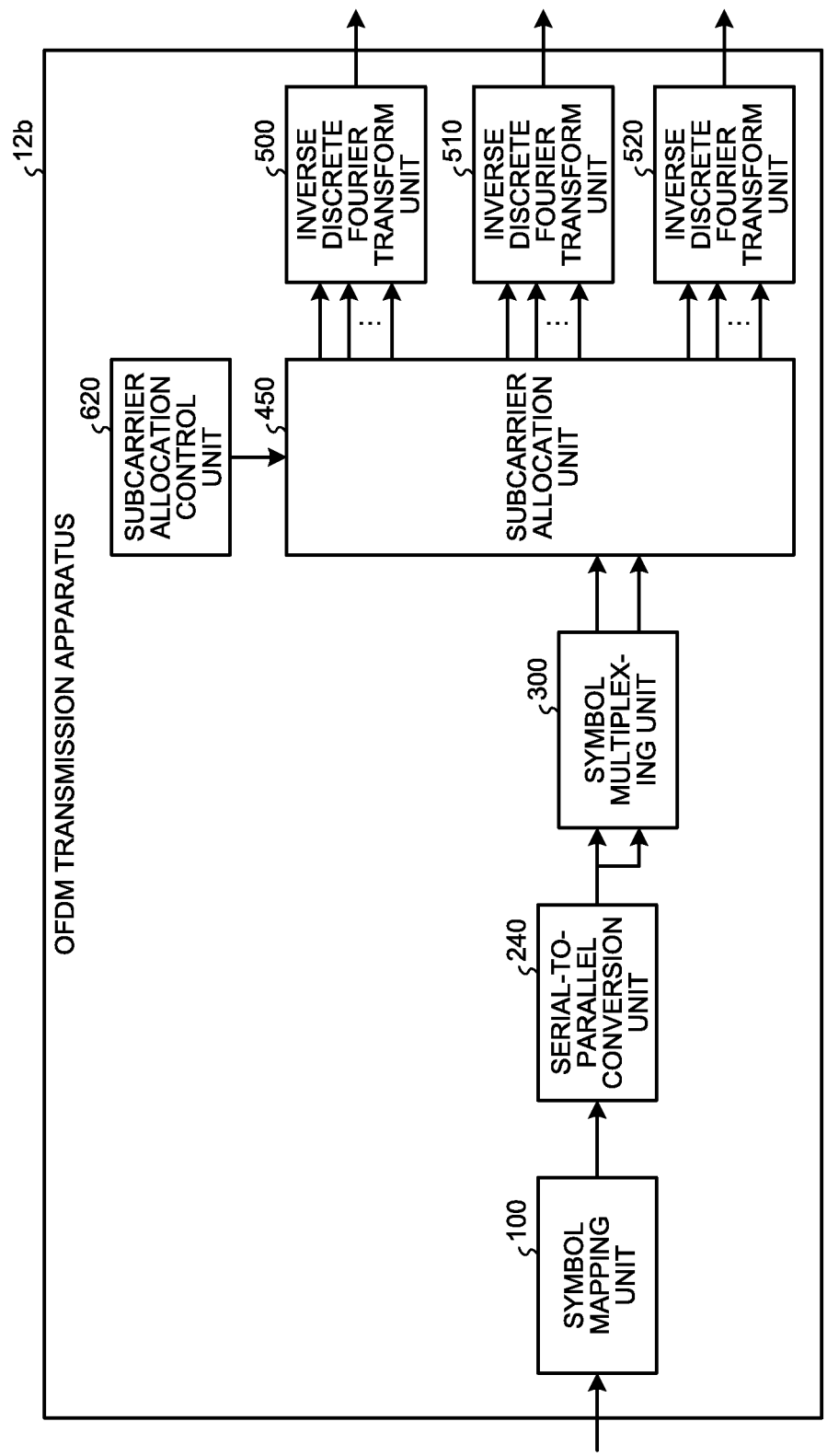
FIG. 31 is a block diagram illustrating an example configuration of an OFDM transmission apparatus according to an eighth embodiment.

FIG. 31 is a block diagram illustrating an example configuration of an OFDM transmission apparatus 12*b* according to the eighth embodiment. As compared with the OFDM transmission apparatus 12*a*, the OFDM transmission apparatus 12*b* is configured such that the subcarrier allocation unit 440 is removed and a subcarrier allocation unit 450 and a subcarrier allocation control unit 620 are added. The OFDM transmission apparatus 12*b* is a transmission apparatus that performs transmission using multiple frequency bands in an OFDM scheme, i.e., using multiple OFDM symbols.

The subcarrier allocation unit 450 changes the OFDM carrier and the subcarrier to which a particular multiplexed symbol is to be allocated on the basis of an instruction from the subcarrier allocation control unit 620.

The subcarrier allocation control unit 620 indicates, to the subcarrier allocation unit 450, the OFDM carrier and the subcarrier number of the subcarrier to which a particular multiplexed symbol is to be allocated. In addition, the subcarrier allocation control unit 620 may control the subcarrier allocation unit 450 to change the subcarrier allocation pattern of a multiplexed symbol pair depending on the transmission timing. For simplicity of illustration, the case of L=2 and M=6 will be described here. As an example, a case will be described below in terms of a first OFDM carrier group transmitted at time $t_1$ and a second OFDM carrier group transmitted at time $t_2$.

Figure 32:
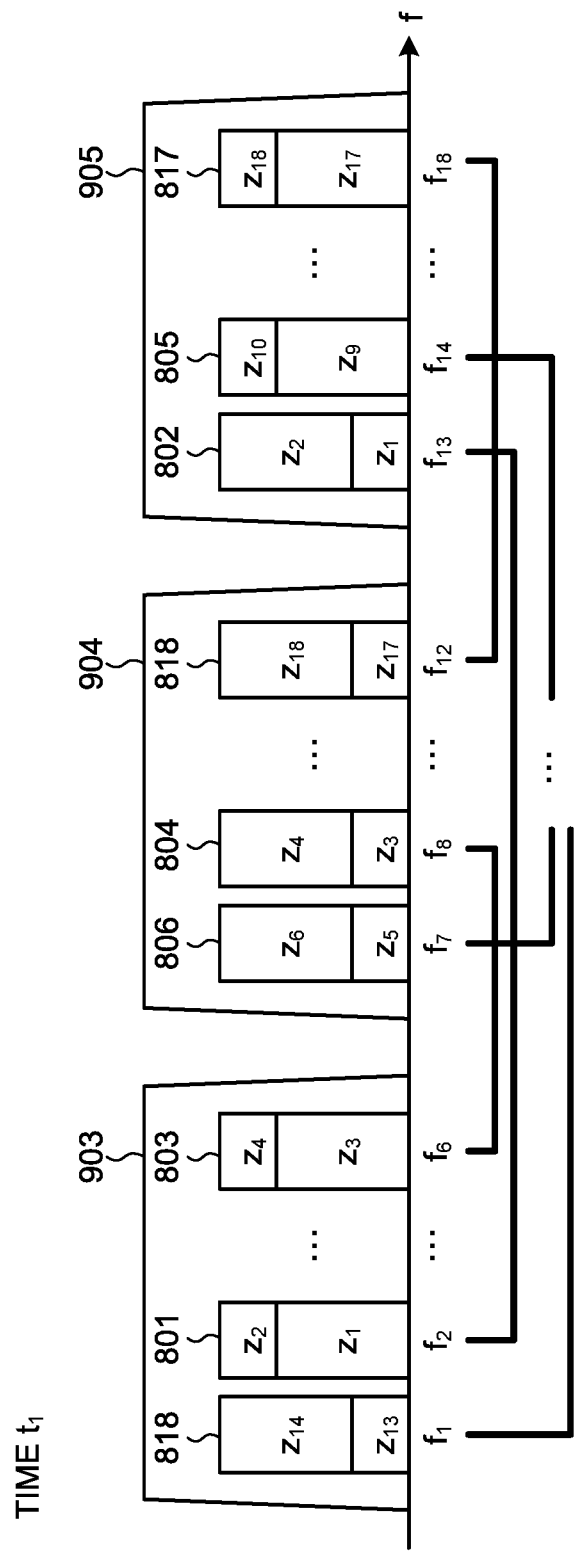
FIG. 32 is a diagram illustrating an example of allocation of multiplexed symbols to subcarriers performed at time $t_1$ by the OFDM transmission apparatus according to the eighth embodiment.
Figure 33:
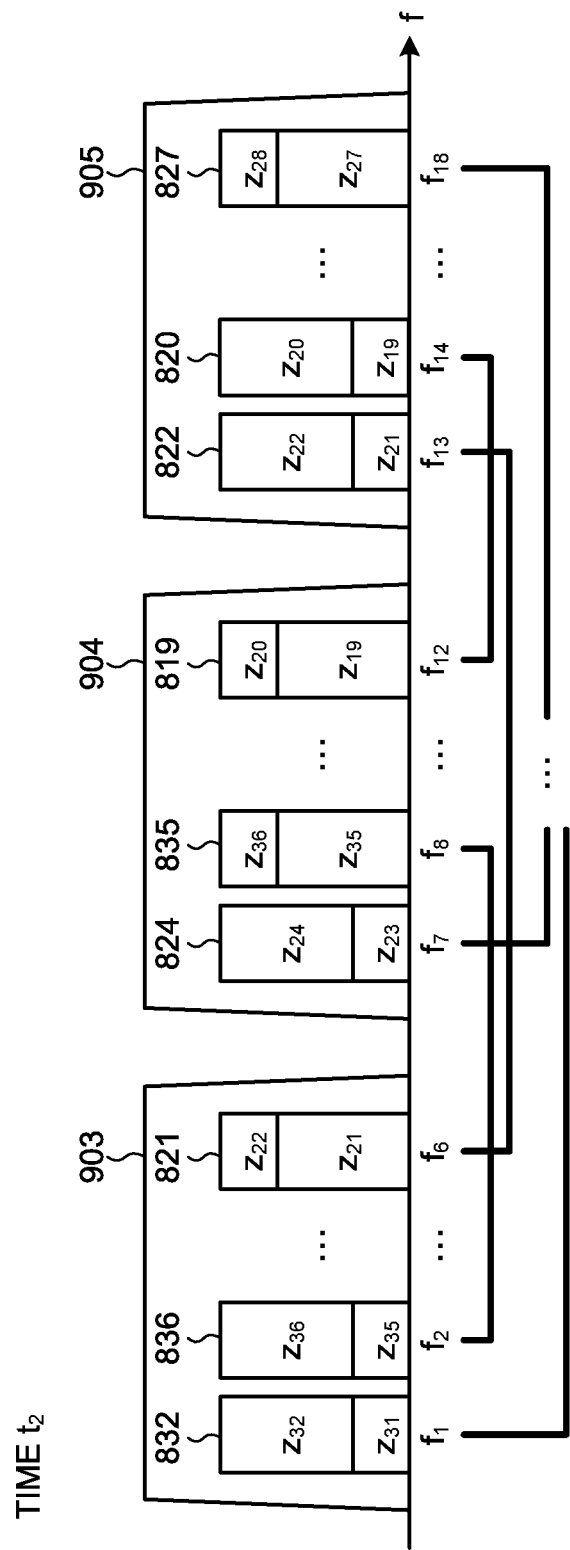
FIG. 33 is a diagram illustrating an example of allocation of multiplexed symbols to subcarriers performed at time $t_2$ by the OFDM transmission apparatus according to the eighth embodiment.

FIG. 32 is a diagram illustrating an example of allocation of multiplexed symbols to subcarriers performed at time $t_1$ by the OFDM transmission apparatus 12*b* according to the eighth embodiment. FIG. 33 is a diagram illustrating an example of allocation of multiplexed symbols to subcarriers performed at time $t_2$ by the OFDM transmission apparatus 12*b* according to the eighth embodiment. For the first OFDM carrier group, the subcarrier allocation control unit 620 controls the subcarrier allocation unit 450 such that, as illustrated in FIG. 32, the multiplexed symbols 801 and 802 each containing the modulated symbols $z_1$ and $z_2$ are respectively allocated to the subcarrier $f_2$ of the OFDM carrier 903 and to the subcarrier $f_{13}$ of the OFDM carrier 905. For the second OFDM carrier group, the subcarrier allocation control unit 620 controls the subcarrier allocation unit 450 such that, as illustrated in FIG. 33, the multiplexed symbols 819 and 820 each containing the modulated symbols $z_{19}$ and $z_{20}$ are respectively allocated to the subcarrier $f_{12}$ of the OFDM carrier 904 and to the subcarrier $f_{14}$ of the OFDM carrier 905.

In FIGS. 32 and 33, the modulated symbols $z_1$ and $z_{19}$ may be different data or the same data. In a case in which the modulated symbols $z_1$ and $z_{19}$ are the same data, the OFDM transmission apparatus 12b applies different subcarrier allocation patterns to the first OFDM carrier group and the second OFDM carrier group to consecutively transmit the same data. Note that the example of subcarrier allocation pattern of multiplexed symbols at each time point is not limited to the examples of FIGS. 32 and 33.

If the time variation of the propagation channel is small, the subcarrier allocation control unit 620 may change the subcarrier allocation pattern of multiplexed symbols at a time interval less than the time variation of the propagation channel. Propagation channel information may be obtained similarly to the second embodiment described above.

Figure 34:
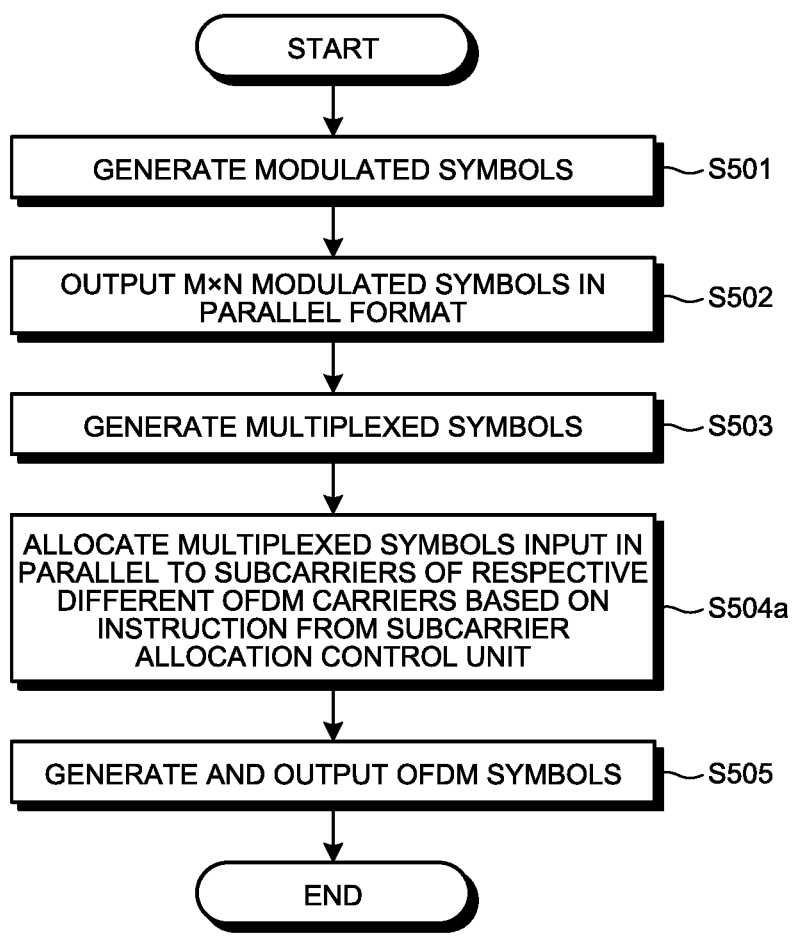
FIG. 34 is a flowchart illustrating OFDM symbol transmission processing performed by the OFDM transmission apparatus according to the eighth embodiment.

FIG. 34 is a flowchart illustrating OFDM symbol transmission processing performed by the OFDM transmission apparatus 12b according to the eighth embodiment. The processing at steps S501 to S503 and step at S505 is similar to that performed by the OFDM transmission apparatus 12a as illustrated in FIG. 29. In the OFDM transmission apparatus 12b, the subcarrier allocation unit 450 allocates L multiplexed symbols input in parallel to subcarriers of respective different OFDM carriers on the basis of an instruction from the subcarrier allocation control unit 620 (step S504a).

As described above, according to the present embodiment, the OFDM transmission apparatus 12b changes the subcarrier allocation pattern of the multiplexed symbols at every OFDM symbol transmission time. This operation enables the OFDM transmission apparatus 12b to randomize the transmission error pattern so as to improve the effect of error correction even when the time variation of the propagation channel is small and the reception electric field intensity of the same subcarrier decreases for a long time due to an effect of frequency-selective fading. Moreover, in a case in which a data sequence is consecutively transmitted over OFDM carrier groups at multiple time points, the operation above enables the OFDM transmission apparatus 12b to reduce the probability that multiplexed symbols each containing the same set of modulated symbols temporally continuously suffer from a transmission error, thereby enabling the effect of error correction to be improved.

The OFDM transmission apparatus 12b may be configured using hardware elements similar to the hardware elements of the OFDM transmission apparatus 10a described above.

Ninth Embodiment

In a ninth embodiment, a modulated symbol is spread using a spreading code depending on the required transmission quality level of that modulated symbol. Differences from the sixth and eighth embodiments will be described below.

Figure 35:
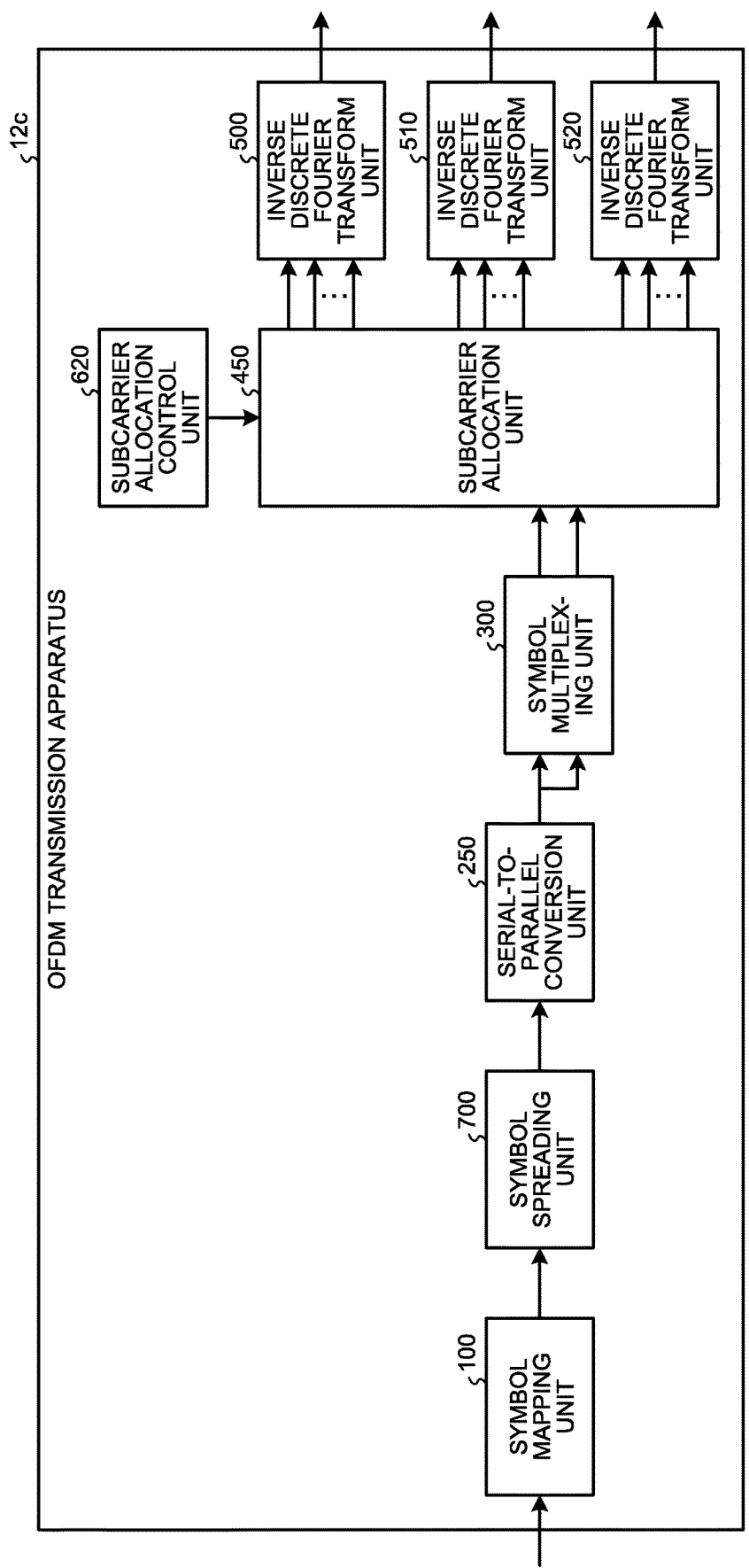
FIG. 35 is a block diagram illustrating an example configuration of an OFDM transmission apparatus according to a ninth embodiment.

FIG. 35 is a block diagram illustrating an example configuration of an OFDM transmission apparatus 12c according to the ninth embodiment. As compared with the OFDM transmission apparatus 12b, the OFDM transmission apparatus 12c is configured such that the serial-to-parallel conversion unit 240 is removed and a serial-to-parallel conversion unit 250 and the symbol spreading unit 700 are added. The OFDM transmission apparatus 12c is a transmission apparatus that performs transmission using multiple frequency bands in an OFDM scheme, i.e., using multiple OFDM symbols.

The serial-to-parallel conversion unit 250 converts, into a parallel format, L symbols generated from different modulated symbols before spreading, of the post-spread symbols input from the symbol spreading unit 700, and outputs M×N modulated symbols, which are modulated symbols corresponding to N OFDM carriers, to the symbol multiplexing unit 300 such that L modulated symbols are output in parallel each time.

Figure 36:
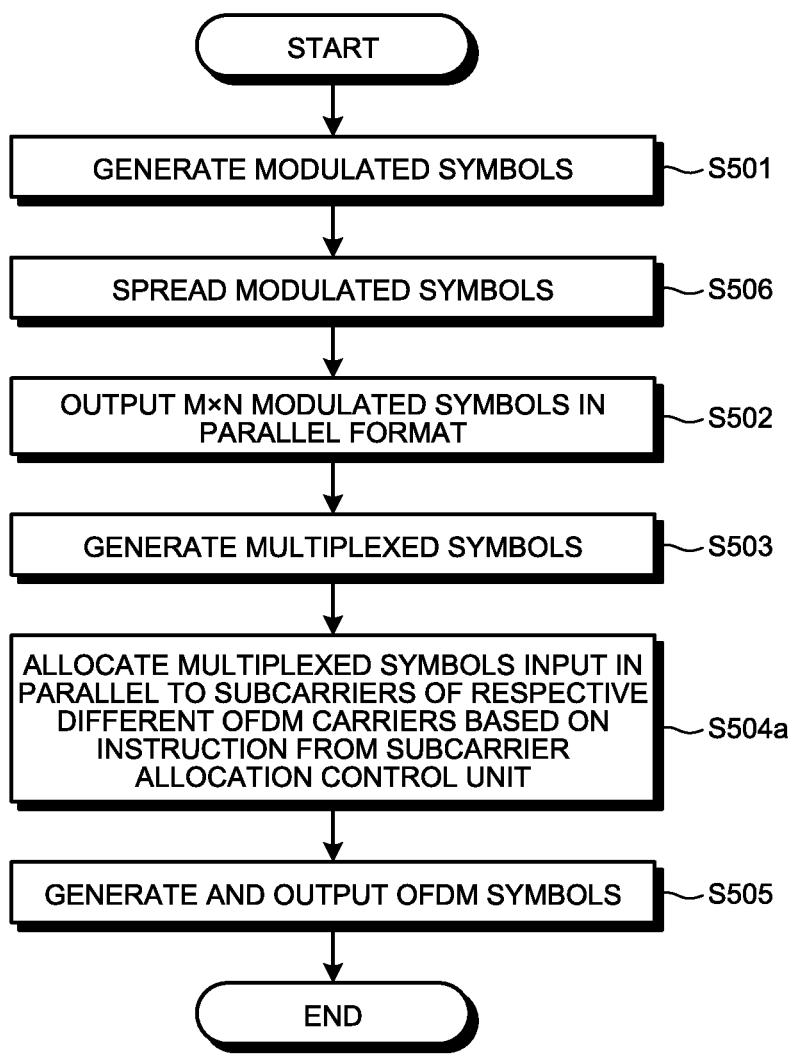
FIG. 36 is a flowchart illustrating OFDM symbol transmission processing performed by the OFDM transmission apparatus according to the ninth embodiment.

FIG. 36 is a flowchart illustrating OFDM symbol transmission processing performed by the OFDM transmission apparatus 12c according to the ninth embodiment. In the OFDM transmission apparatus 12c, after step S501, the symbol spreading unit 700 spreads a modulated symbol generated (step S506). The processing other than step S506 is similar to that performed by the OFDM transmission apparatus 12b as illustrated in FIG. 34.

As described above, according to the present embodiment, the OFDM transmission apparatus 12c performs a spreading operation on a modulated symbol having a high required transmission quality level, and performs no spreading operation on a modulated symbol having a low required transmission quality level but requiring high-capacity transmission. This operation enables the OFDM transmission apparatus 12c to achieve both improvement in transmission quality and reliable provision of required transmission rate.

The features of the ninth embodiment can be applied not only to the eighth embodiment, but also to other configurations, including the seventh embodiment.

The OFDM transmission apparatus 12c may be configured using hardware elements similar to the hardware elements of the OFDM transmission apparatus 10a described above.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST

10a, 10b, 10c, 11a, 11b, 11c, 12a, 12b, 12c OFDM transmission apparatus; 100 symbol mapping unit; 200, 210, 220, 230, 240, 250 serial-to-parallel conversion unit; 300 symbol multiplexing unit; 400, 410, 420, 430, 440, 450 subcarrier allocation unit; 500, 510, 520 inverse discrete Fourier transform unit; 600, 610, 620 subcarrier allocation control unit; 700 symbol spreading unit.

The invention claimed is:

1. A transmission apparatus that performs transmission of a predetermined number of modulated symbols using an orthogonal frequency division multiplexing scheme in a first number of carrier frequencies, where the predetermined number is a product of the first number and a third number, the first number is two or more, and the third number is two or more, the transmission apparatus comprising:

a symbol multiplexer to multiply a column vector containing the first number of modulated symbols generated by primary modulation in a frequency domain, by a precoding matrix having as many rows and columns as the first number to generate the third number of multiplexed symbol groups each containing the first number of multiplexed symbols each containing a second number of the modulated symbols that are multiplexed, where the second number is equal to or more than two and equal to or less than the first number;

a subcarrier allocator to generate the first number of transmission symbol groups each containing the third number of transmission symbols, from the third number of the multiplexed symbol groups; and an inverse discrete Fourier transformer to generate, from the transmission symbol groups, the first number of symbols in the orthogonal frequency division multiplexing scheme, each of the first number of the symbols corresponding to the third number of data subcarriers, wherein the subcarrier allocator allocates the multiplexed symbols contained in each of the multiplexed symbol groups to different transmission symbol groups.

2. The transmission apparatus according to claim 1, wherein the precoding matrix is a matrix that causes a sum of power values of the first number of the modulated symbols before multiplication by the precoding matrix to match a sum of power values of the first number of the multiplexed symbols calculated by multiplication by the precoding matrix.

3. The transmission apparatus according to claim 2, wherein the precoding matrix is a matrix that causes each of the power values of the first number of the modulated symbols before multiplication by the precoding matrix to match a corresponding one of power values of respective modulated symbol elements obtained by conversion, into power values, of the first number of the multiplexed symbols calculated by multiplication by the precoding matrix.

4. The transmission apparatus according to claim 1, further comprising:

a symbol spreader to perform a spreading operation on the modulated symbols generated by primary modulation to generate post-spread symbols that are generated by spreading of the modulated symbol, wherein the symbol multiplexer generates the multiplexed symbol groups containing the first number of the multiplexed symbols using the post-spread symbols.

5. A transmission apparatus that performs transmission using an orthogonal frequency division multiplexing scheme in one or a plurality of frequency bands, the transmission apparatus comprising:

a symbol multiplexer to generate a first number of first column vectors each containing a different combination of a second number of elements among the first number of modulated symbols generated by primary modulation in a frequency domain, where the first number is two or more, and the second number is equal to or more than two and equal to or less than the first number; to multiply the first number of the first column vectors by a precoding matrix having as many rows and columns as the second number to generate the first number of second column vectors each containing the second number of elements; and to select one element from each of the first number of the second column vectors to generate a multiplexed symbol group containing the first number of multiplexed symbols; and a subcarrier allocator to allocate the multiplexed symbols contained in the multiplexed symbol group to different subcarriers, wherein the symbol multiplexer selects an element from the first number of the second column vectors such that each of the first number of the modulated symbols is contained, as one element, in the first number of the multiplexed symbols.

6. The transmission apparatus according to claim 5, wherein the symbol multiplexer selects an element from the first number of the second column vectors to cause a sum of power values of the first number of the modulated symbols before multiplication by the precoding matrix to match a sum of power values of the first number of the multiplexed symbols.

7. The transmission apparatus according to claim 6, wherein the symbol multiplexer selects an element from the first number of the second column vectors to cause each of the power values of the first number of the modulated symbols before multiplication by the precoding matrix to match a corresponding one of power values of respective modulated symbol elements obtained by conversion, into power values, of the first number of the multiplexed symbols.

8. The transmission apparatus according to claim 5, wherein, in a case in which the one or a plurality of frequency bands is one frequency band and one symbol in the orthogonal frequency division multiplexing scheme includes a third number of the subcarriers, where the third number is greater than the first number, the subcarrier allocator allocates the first number of the multiplexed symbols contained in the multiplexed symbol group to subcarriers separated from each other by a fourth number of the subcarriers, where the fourth number is calculated by division of the third number by the first number.

9. The transmission apparatus according to claim 5, wherein, in a case in which the one or a plurality of frequency bands is a plurality of frequency bands, the subcarrier allocator allocates the first number of the multiplexed symbols contained in the multiplexed symbol group to subcarriers of symbols in the orthogonal frequency division multiplexing scheme in different frequency bands.

10. The transmission apparatus according to claim 5, wherein the subcarrier allocator allocates the first number of the multiplexed symbols contained in a multiplexed symbol group having a higher required transmission quality level to subcarriers relatively widely separated from each other in a frequency direction, and allocates the first number of the multiplexed symbols contained in a multiplexed symbol group having a lower required transmission quality level than a required transmission quality level of the multiplexed symbol group having the higher required transmission quality level, to subcarriers less separated from each other in the frequency direction than the subcarriers to which the first number of the multiplexed symbols contained in the multiplexed symbol group having the higher required transmission quality level are allocated.

11. The transmission apparatus according to claim 5, wherein the subcarrier allocator changes the subcarriers to which the multiplexed symbols are allocated each time a symbol in the orthogonal frequency division multiplexing scheme in each of the one or plurality of frequency bands is output.

12. The transmission apparatus according to claim 5, further comprising:

a symbol spreader to perform a spreading operation on the modulated symbols generated by primary modulation to generate post-spread symbols that are generated by spreading of the modulated symbol, wherein the symbol multiplexer generates the multiplexed symbol group containing the first number of the multiplexed symbols using the post-spread symbols.

13. A transmission method of a transmission apparatus that performs transmission using an orthogonal frequency division multiplexing scheme in one or a plurality of frequency bands, the transmission method comprising:
- a first column vector generation of generating a first number of first column vectors each containing a different combination of a second number of elements among the first number of modulated symbols generated by primary modulation in a frequency domain, where the first number is two or more, and the second number is equal to or more than two and equal to or less than the first number;
- a second column vector generation of multiplying the first number of the first column vectors by a precoding matrix having as many rows and columns as the second number to generate the first number of second column vectors each containing the second number of elements;
- a symbol multiplexing of selecting one element from each of the first number of the second column vectors to generate a multiplexed symbol group containing the first number of multiplexed symbols; and
- a subcarrier allocation of allocating the multiplexed symbols contained in the multiplexed symbol group to different subcarriers, wherein
- in the symbol multiplexing, an element is selected from the first number of the second column vectors such that each of the first number of the modulated symbols is contained, as one element, in the first number of the multiplexed symbols.

14. A transmission apparatus that performs transmission using an orthogonal frequency division multiplexing scheme in one or a plurality of frequency bands, the transmission apparatus comprising:
- a symbol multiplexer to multiply a column vector containing a first number of modulated symbols generated by primary modulation in a frequency domain, by a precoding matrix having as many rows and columns as the first number to generate a multiplexed symbol group containing the first number of multiplexed symbols each containing a second number of the modulated symbols that are multiplexed, where the first number is two or more, and the second number is equal to or more than two and equal to or less than the first number; and
- a subcarrier allocator to allocate the multiplexed symbols contained in the multiplexed symbol group to different subcarriers, wherein
- the subcarrier allocator allocates the first number of the multiplexed symbols contained in a multiplexed symbol group having a higher required transmission quality level to subcarriers relatively widely separated from each other in a frequency direction, and allocates the first number of the multiplexed symbols contained in a multiplexed symbol group having a lower required transmission quality level than a required transmission quality level of the multiplexed symbol group having the higher required transmission quality level, to subcarriers less separated from each other in the frequency direction than the subcarriers to which the first number of the multiplexed symbols contained in the multiplexed symbol group having the higher required transmission quality level are allocated.

15. The transmission apparatus according to claim 14, wherein the precoding matrix is a matrix that causes a sum of power values of the first number of the modulated symbols before multiplication by the precoding matrix to match a sum of power values of the first number of the multiplexed symbols calculated by multiplication by the precoding matrix.

16. The transmission apparatus according to claim 15, wherein the precoding matrix is a matrix that causes each of the power values of the first number of the modulated symbols before multiplication by the precoding matrix to match a corresponding one of power values of respective modulated symbol elements obtained by conversion, into power values, of the first number of the multiplexed symbols calculated by multiplication by the precoding matrix.

17. The transmission apparatus according to claim 14, further comprising:
- a symbol spreader to perform a spreading operation on the modulated symbols generated by primary modulation to generate post-spread symbols that are generated by spreading of the modulated symbol, wherein
- the symbol multiplexer generates the multiplexed symbol group containing the first number of the multiplexed symbols using the post-spread symbols.

18. A control circuit of a transmission apparatus that performs transmission of a predetermined number of modulated symbols using an orthogonal frequency division multiplexing scheme in a first number of carrier frequencies, where the predetermined number is a product of the first number and a third number, the first number is two or more, and the third number is two or more, the control circuit being configured to:
- multiply a column vector containing the first number of modulated symbols generated by primary modulation in a frequency domain, by a precoding matrix having as many rows and columns as the first number to generate the third number of multiplexed symbol groups each containing the first number of multiplexed symbols each containing a second number of the modulated symbols that are multiplexed, where the second number is equal to or more than two and equal to or less than the first number;
- generate the first number of transmission symbol groups each containing the third number of transmission symbols, from the third number of the multiplexed symbol groups; and
- generate, from the transmission symbol groups, the first number of symbols in the orthogonal frequency division multiplexing scheme, each of the first number of the symbols corresponding to the third number of data subcarriers, wherein
- the multiplexed symbols contained in each of the multiplexed symbol groups are allocated to different transmission symbol groups.

19. A non-transitory computer-readable recording medium of a transmission apparatus that performs transmission of a predetermined number of modulated symbols using an orthogonal frequency division multiplexing scheme in a first number of carrier frequencies, where the predetermined number is a product of the first number and a third number, the first number is two or more, and the third number is two or more, the recording medium storing therein a program for causing a processor to execute: a process of:
- multiplying a column vector containing the first number of modulated symbols generated by primary modulation in a frequency domain, by a precoding matrix having as many rows and columns as the first number to generate the third number of multiplexed symbol groups each containing the first number of multiplexed symbols each containing a second number of the modulated symbols that are multiplexed, where the second number is equal to or more than two and equal to or less than the first number;

generating the first number of transmission symbol groups each containing the third number of transmission symbols, from the third number of the multiplexed symbol groups; and generating, from the transmission symbol groups, the first number of symbols in the orthogonal frequency division multiplexing scheme, each of the first number of the symbols corresponding to the third number of data subcarriers, wherein the multiplexed symbols contained in each of the multiplexed symbol groups are allocated to different transmission symbol groups.

* * * * *